(12) United States Patent
Wiener et al.

(10) Patent No.: US 6,598,051 B1
(45) Date of Patent: Jul. 22, 2003

(54) WEB PAGE CONNECTIVITY SERVER

(75) Inventors: Janet L. Wiener, Palo Alto, CA (US); Raymond P. Stata, Palo Alto, CA (US); Michael Burrows, Palo Alto, CA (US)

(73) Assignee: Altavista Company, Palo Alto, CA (US)

( * ) Notice: Subject to any disclaimer, the term of this patent is extended or adjusted under 35 U.S.C. 154(b) by 278 days.

(21) Appl. No.: 09/664,647

(22) Filed: Sep. 19, 2000

(51) Int. Cl.⁷ .............................................. G06F 17/00
(52) U.S. Cl. ............................ 707/100; 707/10; 707/2; 707/102; 707/104.1; 709/201; 709/218; 709/224
(58) Field of Search .................... 707/1, 2, 10, 100, 707/102, 104.1; 709/218, 224, 201

(56) References Cited

U.S. PATENT DOCUMENTS

| | | | |
|---|---|---|---|
| 5,797,135 A | | 8/1998 | Whalen et al. ................ 706/53 |
| 5,809,502 A | | 9/1998 | Burrows ......................... 707/7 |
| 5,832,500 A | | 11/1998 | Burrows ...................... 707/103 |
| 5,855,020 A | * | 12/1998 | Kirsch ........................... 707/10 |
| 5,864,863 A | | 1/1999 | Burrows ...................... 707/103 |
| 5,907,680 A | * | 5/1999 | Nielsen ....................... 709/228 |
| 5,966,710 A | | 10/1999 | Burrows ...................... 707/103 |
| 6,012,087 A | * | 1/2000 | Freivald et al. ............. 709/218 |
| 6,021,409 A | | 2/2000 | Burrows ...................... 707/102 |
| 6,067,543 A | | 5/2000 | Burrows ......................... 707/4 |
| 6,073,135 A | | 6/2000 | Broder et al. ............... 707/100 |

FOREIGN PATENT DOCUMENTS

| | | | | |
|---|---|---|---|---|
| JP | 2000-207410 | * | 7/2000 | ........... G06F/17/30 |

OTHER PUBLICATIONS

Gun–Woo Nam; Jong–Hee Park; Tai–Yun Kim; Dynamic management of URL based on object–oriented paradigm, Parallel and Distributed Systems, 1998. Proceedings. 1998 International Conference on, 1998. pp. 226–230.*

* cited by examiner

*Primary Examiner*—Diane D. Mizrahi
*Assistant Examiner*—Michael Spiegel
(74) *Attorney, Agent, or Firm*—Pennie & Edmonds LLP

(57) ABSTRACT

A connectivity server for a collecting, arranging and representing data defining the interconnection of pages on the World Wide Web (Web). A URL Database stores URLs and associates a fingerprint and CS_id with each URL. The URL Database interface is operable to translate between any two of a URL, a fingerprint, and a Host_id. A Host Database associates a Host_id with each distinct hostname in the URL Database. The Host Database interface is operable to accept a Host_id and return a number equal to the number of URLs on the respective host and to return the CS_ids of those URLs. A Link Database stores links between source URLs and destination URLs. The Link Database interface is operable to retrieve, for a given CS_id, the number of inlinks to and outlinks from the URL corresponding to the CS_id. In an embodiment characterized by a single processor, with access to all databases stored in RAM links and URL information may be retrieved sufficiently rapidly so that applications that touch every link, even multiple times, may execute in real time, in a few minutes or hours. Representative applications enabled by the connectivity server include static ranking of pages (eigenranks), query precomputation, mirror-site detection, and related-page identification.

60 Claims, 19 Drawing Sheets

URLDB: Prefix compress urls

```
http://kiva.net/~markh/surnames.html
http://kiwi-us.com/~amigo/links/index.htm
http://kiwi.emse.fr/
http://kiwi.etri.re.kr/~khshim/internet/bookmark.html
http://kiwi.etri.re.kr/~ksw/bookmark
http://kiwi.futuris.net/linen
http://kiwi.futuris.net/linen/special/backiss.html
```

Prefix compress →

```
0kiva.net/~markh/surnames.html#
2wi-us.com/~amigo/links/index.htm#
4.emse.fr/#
6tri.re.kr/~khshim/internet/bookmark.html#
18sw/bookmark#
5futuris.net/linen#
22/special/backiss.html#
```

FIGURE 11

URLDB: url index

- 1 index entry per M urls (M = 4)
- Each entry is 8 byte offset into compressed urls

URLDB: Id index

Compute fingerprint(url):

FP(kiva.net/~markh/surnames.html) = 0x2698e438941d4ff2 id index

0x2698e438941d4ff2,101008
0x573fa9344d5803c4,101014
0x83f4da58902d4dc0,196243
....

Hash table:
Hash key = high 3 bytes of uid
Store low 5 bytes of uid + csid

FIGURE 13

HOSTDB: Host table

Host table

| Hostid | Startid | nConsec | Hostid | Next |
|---|---|---|---|---|
| 1 | 4 | 1 | 1 | 17 |
| 2 | 5 | 3 | 2 | 19 |
| 3 | 8 | 2 | 3 | 22 |
| ... | ... | ... | ... | ... |
| 17 | 892 | 15 | 1 | -1 |
| | ... | ... | ... | ... |

FIGURE 14

WEB PAGE CONNECTIVITY SERVER

INCORPORATION BY REFERENCE

By this reference, the following U.S. Patents and Patent Application are hereby incorporated into this Patent Application, in entirety and for all purposes:

U.S. patent application Ser. No. 09/664,617, filed on even date with this Application and entitled "WEB PAGE CONNECTIVITY SERVER CONSTRUCTION," by Janet L. Wiener and Michael Burrows;

U.S. Pat. No. 6,073,135, entitled "CONNECTIVITY SERVER FOR LOCATING LINKAGE INFORMATION BETWEEN WEB PAGES," to Andrel Z. Broder, Michael Burrows, Monika H. Henzinger, Sanjay Ghemawat, Puneet Kumar, Suresh Venkatasubramanian;

U.S. Pat. No. 5,864,863, entitled "METHOD FOR PARSING, INDEXING AND SEARCHING WORLD-WIDE-WEB PAGES," to Michael Burrows;

U.S. Pat. No. 5,832,500, entitled "METHOD FOR SEARCHING AN INDEX," to Michael Burrows; and U.S. Pat. No. 5,809,502, entitled "OBJECT-ORIENTED INTERFACE FOR AN INDEX," to Michael Burrows.

BACKGROUND OF THE INVENTION

1. Field of the Invention

The invention relates to techniques for collecting, arranging, and coordinating information pertaining to the connectivity of Web pages and, more particularly, to the construction of a connectivity server, including a data structure incorporating a URL Database, a Host Database and a Link Database, the connectivity server for facilitating efficient and effective representation and navigation of Web pages.

2. Description of the Related Art

The World Wide Web (Web) is constituted from the entire set of interlinked hypertext documents that reside on Hypertext Transfer Protocol (HTTP) servers that are globally connected by Internet. Documents resident on the Web (Web pages) are generally written in a mark-up language such as HTML (Hypertext Markup Language) and are identified by URLs (Uniform Resource Locators). In general, URLs correspond to addresses of Internet resources and serve to specify the protocol to be used in accessing a resource, as well as the particular server and pathname by which the resource may be accessed.

Files are transmitted from a Web server to an end user under HTTP. Codes, called tags, that are embedded in an HTML document associate particular words and images in the document with URLs, so that an end user can access other Web resources, regardless where physically located, upon the activation of a key or mouse.

Users of client computers use Web browsers to locate Web pages that, as indicated above, are identified by URLs. Specialized servers, called search engines, maintain indices of the contents of Web pages. The browsers may be used to pose textual queries. In response, the search engines return result sets of URLs that identify Web pages that satisfy the queries. Usually, the result sets are rank ordered according to relevance.

In this regard, information related to the connectivity of Web pages, such as the number of links to or from a page, can be used as a tie-breaking mechanism in ranking the result sets or as an input in deciding the relative importance of result pages.

The URL names of the result sets may then be used to retrieve the identified Web pages, as well as other pages connected by "hot links."

However, many users are interested in more than merely the content of the Web pages. Specifically, users may be interested in the manner in which Web pages are interconnected. In other words, users may be interested in exploring the connectivity information embedded within the Web for practical, commercial, or other reasons.

The connectivity information provided by search engines exists largely as a byproduct of their paramount function. Although an unsophisticated user may easily follow a trail between connected Web pages, the extraction of global view of connectivity quickly becomes tedious. The connectivity representation in the search engines serves a single purpose: to provide answers to queries. However, determination of all pages that are, for example, two links removed from a particular page may require thousands of queries, and a substantial amount of processing by the user. Without a separate representation of the Web, it is very difficult to provide linkage information. In fact, most search engines fail to provide access to any type of connectivity information.

This is a significant drawback, because linkage information between Web pages is a valuable resource for Web visualization and page ranking. Several ongoing research projects use such information. Most connectivity information is obtained from ad-hoc Web "crawlers" that build relatively small databases of local linkage information.

A database may be constructed on the fly or statically. When constructed on the fly, each new page is parsed as it is accessed in order to identify links. The linked neighboring pages are retrieved until the required connectivity information is gathered. When statically constructed, a connectivity database is essentially rebuilt from scratch whenever updates are required. For example, the service designated Linkalert™ provided by Lycos (see http://www/lycos.com/linkalert/Overview.htm), uses static databases specifically designed to offer linkage information for particular Web sites. Earlier implementations of both on-the-fly and static approaches have proven inefficient and clumsy to use, and do not comprehend to the entire Web and a large number of clients. Consequently, prior-art implementations of connectivity databases generally perform poorly and/or are limited in scope.

Accordingly, U.S. Pat. No. 6,073,135, entitled "Connectivity Server for Locating Linkage Information Between Web Pages," hereby incorporated by reference, is directed to a server that enables convenient and efficient representation and navigation of connectivity information of Web pages. The server described therein (hereinafter "CS1") maintains accurate linkage information for a significant portion of the Web and supports a large number of client users that desire numerous variants of connectivity information. In addition, the system dynamically updates the connectivity information so that the linkage information is current.

FIGS. 1 through 9 of the Drawings depict the implementation of CS1 in accordance with U.S. Pat. No. 6,073,135.

As depicted in FIG. 1, the Web is shown to comprise a widely distributed network of computers 100 that include numerous client computers 110 connected to server computers 120 by a network 130. Generally, servers 120 provide information, products, and services to users of the clients 110.

Client computers 110 may be personal computers (PCs), workstations, or laptops. Typically, clients are equipped with input/output devices 115, such as a keyboard, mouse, and display device 115. Software in the form of a Web browser 111 interacts with devices 115 to provide an interface between the user and the Web.

The server computers 120 are usually larger computer systems, although this does not always need to be so. Some of the servers, also known as "Web sites," maintain a database (DB) 121 of Web pages 122. Each Web page 122 is identified and can be located by its URL 123. Web pages are usually formatted using HTML, which establishes links to other pages. A user is afforded the opportunity to "click" on a link within a page viewed with the browser in order to access a "pointed to" page.

Search engines, in the form of servers 140, maintain an index 141 of the contents of Web pages. Using a search engine application programming interface (API) 142, client users may locate pages having specific content of interest to the users. The user specifies pages of interest to the API of the search engine 140 by composing queries that are processed by the search engine's API 142.

A specialized, "connectivity" server 150 is also provided. Connectivity server 150 maintains a connectivity database 151. Using a connectivity server API 152, users may locate pages (URLs) according to the definition of the interconnection between pages.

As shown in FIG. 2, a graph 200 is built to represent the connectivity of web pages. In the graph 200, each node (A, . . . , G) 210 represents a Web page 122. Each edge, for example an edge (AB) 220 represent a link from one page to another, for example, with edge AB representing a link from page A to page B. The connectivity API 152, in various forms, enables client users to "explore" or navigate" graph 200 to extract connectivity information.

It is readily appreciated that the data representation of graph 200 in memory must be carefully designed to minimize memory storage requirements. Assuming the graph contains approximately 100M Web pages with an average outdegree of seven, then the graph will have about 700M edges. A rudimentary implementation would store two pointers per edge. Furthermore, given that the average size of a URL is about 80 bytes, the uncompressed URLs of the nodes depicted in the rudimentary implementation will occupy about 8 Gb (Gigabytes). From another perspective, storage of 1 B (uncompressed) edges will similarly require 8 Gb of storage, even if the endpoints are susceptible of representation as 4-byte integers. Because currently, 1 B edges may typically be captured in a single week's web crawl, the demand for storage capacity quickly becomes extraordinary.

Graph 200 is built, maintained, and traversed as follows. Preferably, the input utilized in building the graph is provided by the search engine 140. However, it should be understood that the input for constructing the graph may also come from other sources.

As shown in FIG. 3, the input for constructing graph 200 is a set of URLs {URL A, . . . , URL Z} 310. URL set 310 identifies known Web pages 122. The URLs or names of the set 310 are first lexicographically sorted in module 320. Next, the sorted URLs are delta encoded in module 330 to produced a list 340. In list 340, each entry 341 is stored in as a difference (delta) between the current URL and a previous URL. Because pages maintained at the same site are likely to have fairly large prefix portion in common, storage reduction due to delta encoding is considerable. For 100 million URLs, storage may be reduced by about 70%.

For example, if the input URLs 310 are:

www.foobar.com/ www.foobar.com/gandalf.html www.foograb.com/, then the output, delta-encoded URLs 340 are:

0 www.foobar.com/

14 gandalf.html 7 grab.com/

More precisely, each entry 341 of the list 340 includes the following fields: a size field 342 that indicates the number of common bytes with the previous URL; a delta field 343 that stores the bytes that are different than the shared prefix, terminated by a zero byte 344; finally, a field (Node ID) 345 identifies the node that represents the corresponding page.

Delta encoding URL values comes at a price, namely an increase in the processing required to perform during an inverse translation to recover a full URL. In order to recover a complete URL, one must start with the first entry of the list 340 and linearly apply all delta values 342 until the URL under consideration is reconstructed.

This situation may be ameliorated by periodically remembering an entire URL as a checkpoint URL entry 350. The checkpoints 350 can be maintained as a separate sorted list 360 on which a binary search can be applied. Thus, once the closest preceding checkpoint URL 350 has been located, only the delta values from that point on need be applied. The cost of inverse translation can be controlled by the number of entries 350 in the checkpoint list 360. In one embodiment, a checkpoint entry may be maintained for approximately every thousand bytes of URL data in the list 340.

Referring now to FIG. 4, the edges of the graph 200 are constructed from a list of pairs 410. Each pair 420 includes the node ID of a first (URL1) 421, and a second node ID (URL2) 422 of a second page that contains a link to the first page. The pairs 420 essentially indicate the connectivity of the pages. The pairs may be obtained from a search engine 140 or from other sources.

The list 410 is sorted twice (431, 432), first according to the first node ID 421 to produce an inlist table 441, and, second, according to the second node ID 422 to produce an outlist table 442. The inlist table contains only the second node ID from each pair: the high order bit (bit 32) 450 of a list entry is set to indicate the end of a group of common connected nodes, that is a group of nodes that point to the same page P. The entry 510, described below and illustrated in FIG. 5, corresponding to P contains a field 512 that points to the beginning of the group of nodes within the inlist that point to P. The outlist table is organized in a similar way. In other words, each edge 220 of the graph 200 is represented twice to indicate pages pointing to a particular page, and to indicate pages pointed to from a particular page.

As shown in FIG. 5, graph 200 itself is maintained as an array 500. The nodes of the graph are represented by elements 510 of the array 500. Each element 510 includes three fields 511, 512 and 513. Field 511 stores a pointer (URL pointer) to the delta-encoded list 340 of FIG. 3. Fields 512 and 513 point to the corresponding respective inlist 441 and outlist 442. In other words, field 511 points to the node name, field 512 points to the incoming edges, and field 513 points to the outgoing edges.

As shown in FIG. 6, a user is able to explore the connectivity of the Web by supplying an input URL (URL in) 601. The input URL 601 is used to binary (or interpolation) search 610 the checkpoint list 360 to locate the closest delta checkpoint 350. Subsequently, delta values 343 are applied in a Delta Scan module 620 until a full URL 621 equal to the input 601 is recovered. The associated node ID 345 is used to index, via module 630, the array 500. Indexing the array 500 locates a start node 631 from which connectivity can be explored in step 640. Graph 200 can be navigated to the depth desired using the inlist table 441 and outlist table 442, thereby producing an output list of URLs (URLs out) 609.

FIG. 7 depicts in greater detail a data structure (ID-to-URL Array) 511 that is used to recover a full URL from a node ID. In the array 511, one entry exists for each node 210 in graph 200. Entries 701 point to the nearest checkpoint URL 350 for each node in the checkpoint list 360. Subsequent delta values 343 are applied until an entry with a matching node ID 345 is found. At this pint, the full URL 709 has been recovered.

The above-referenced process is illustrated in FIG. 8. The input to the process is one of the output URLs 609 of FIG. 6. The node ID is used as an index in the ID-to-URL table 511 to determine a closest checkpoint 350. Delta values are decoded until the matching node ID in field 345 is found, at which point the full URL 709 has been recovered.

The overall structure of the connectivity server 150 is shown in FIG. 9. The connectivity data structures 151 may, in one embodiment, be stored in a hard disk, or disk array, associated with server 150. The connectivity structures 151 include the delta encoded list 340 of URLs, including checkpoints, as well as inlist and outlist tables 441 and 442, the node ID array 500, and the ID-to-URL array 511. Connectivity processes 910 are operable to locate a starting node in the graph 200 for a given URL. The processes 910 can also navigate the graph 200 to locate connected nodes. Data structure 151 may be updated to add new nodes and edges that correspond to newly found pages and links, or to delete portions of the graph for which Web pages are no longer accessible.

Connectivity server 150 includes the following APIs. A first API 911 interfaces to the search engine 140. This interface is used to obtain the URLs of Web pages that are represented by the nodes of the graph. A Web API 912 is connected to a conventional Web HTTP server 920 to provide a World Wide Web interface 921.

In addition, a public API 913 is provided for public clients 930, and a private API 914 is provided for private clients 940. The private API 914 allows access to more efficient data structures and processes for privileged users. A user may gain access to the APIs with the browser 111 of FIG. 1.

A basic connectivity query assumes the form: "List L," where L is the URL of a Web page. In response, the connectivity server supplies a list of all URLs pointing to Web page L, as well as all Web pages pointed to by page L.

A neighborhood query assumes the form: "List L, D," where D specifies the degree of connectivity to be explored. Here the connectivity server's response will be a list of URLs at a distance D from page L. It should be understood that more complex queries may be composed specifying logical combinations of URLs and distances. A private query allows users to pose queries in an internal format of the connectivity server; and the server's response may include more detailed information, such as names of the servers storing the connected pages.

As described above, the connectivity server provides linkage information for a significant portion of the Web. The information can be used by applications that rank Web pages according to their connectivity. For instance, pages with many connections may be considered authoritative pages, or "hubs." The information can be used to build Web visualization and navigation tools, and can be used in conjunction with search engine results to lead users to portions of the Web that store content that may be of interest. In addition, the technique may be used to optimize the design and implementation of Web crawlers based on statistics derived from the in degrees and out degrees of nodes.

In one embodiment, the connectivity server described above may be implemented on Digital Equipment Corporation 300 MHz Alpha processors configured with 4 GB of RAM and a 48 GB disk. Graph 200 included 230M nodes with about 360M edges. The average storage space for each URL is approximately 25 bytes for a total of 5.6 Gigabytes for the delta compressed URL database. The connectivity server responds to user queries at the rate of about one URL every 0.1 millisecond.

Although the connectivity server described above may fairly be viewed as a substantial advance in the techniques formerly available for extracting connectivity information related to Web pages, there remain opportunities for further significant advances that are addressed by the subject invention. For example, further compression of both URLs and links results in the ability to store appreciably more information in the same quantity of physical storage media. In addition, the subject invention enables connectivity information to be extracted more rapidly than heretofore, thereby facilitating applications such as the static ranking of pages (eigenranks), query precomputation, mirror site detection and related-page identification.

SUMMARY OF THE INVENTION

The above and other features, capabilities and advantages as achieved, in one aspect of the invention, by a connectivity server that comprises a URL Database that stores URLs and that associates a fingerprint and a CS_id with each stored URL; a Host Database that associates a Host_id with each distinct hostname in the URL Database; and a Link Database that stores links between a source URL and a destination URL. The URL Database interface is operable to translate between any two of a URL, a fingerprint, and a Host_id. The Host Database interface is operable to accept a Host_id and return a number equal to the number of URLs on the respective host and to return the CS_ids of those URLs. The Link Database interface is operable to retrieve, for a given CS_id, the number of inlinks to and outlinks from the URL corresponding to the CS_id.

In another aspect, the invention is embodied in A computer program product for efficiently arranging and storing information regarding the World Wide Web (Web). The computer program product may be used in connection with a computer system, including but not limited to a connectivity server, and comprises a computer readable storage medium onto which is written information and instructions in the form of a URL Databases that comprises: a plurality of URLs, a fingerprint associated with each of the URLs, and a URL Interface for translating a URL to a fingerprint or to a CS_id, a fingerprint to a URL or to a CS_id, and a CS_id to a URL or to a fingerprint. In a more specific realization of the computer program product, the URL Database comprises at least three partitions. A first partition is occupied by URLs with a respective indegree or outdegree that is greater than a first number; a second partition is occupied by URLs with a respective indegree or outdegree that is greater than or equal to a second number but less than the first number; and a third partition is occupied by URLs with a respective indegree or outdegree that is less than the second number.

A further aspect of the invention may be apprehended as a method for obtaining data defining the connectivity of pages on the Web. The method comprises obtaining access to a URL Database that stores URLs and that associates a fingerprint and a CS_id with, each stored URL, wherein the URL Database comprises a URL Database API and a URL Index Array; obtaining access to a Host Database that associates a Host_id with each distinct hostname in the URL Database, wherein the host comprises a Host Database API that operates to accept a CS_id and return a corresponding Host_id and to accept a Host id and return the CS_ids on the corresponding host; and obtaining access to a Link Database that stores links between source URLs and destination URLs, wherein the Link Database comprises a Link Database API that operates to retrieve, for a given CS_id, the number of outlinks from the URL corresponding to the CS_id and the number of inlinks to that URL.

BRIEF DESCRIPTION OF THE DRAWINGS

FIG. 11 is a graphical depiction of the prefix compression performed on URLs stored in the URL Database of the subject invention.

FIG. 13 is a representation of the ID Index as a hash table that maps URL fingerprints to CS_ids.

FIG. 14 depicts a Host Table in which consecutively numbered Host_ids are defined by the starting CS_id in a series on the same host. The Host Table is shown to also store the number of CS_ids in the series, the Host_id for the series, and the row number of the next highest row in the Host Table with the same Host_id.

DETAILED DESCRIPTION

For a thorough understanding of the subject invention, reference is made to the following Description, including the appended Claims, in connection with the above-described Drawings.

Figure 1:
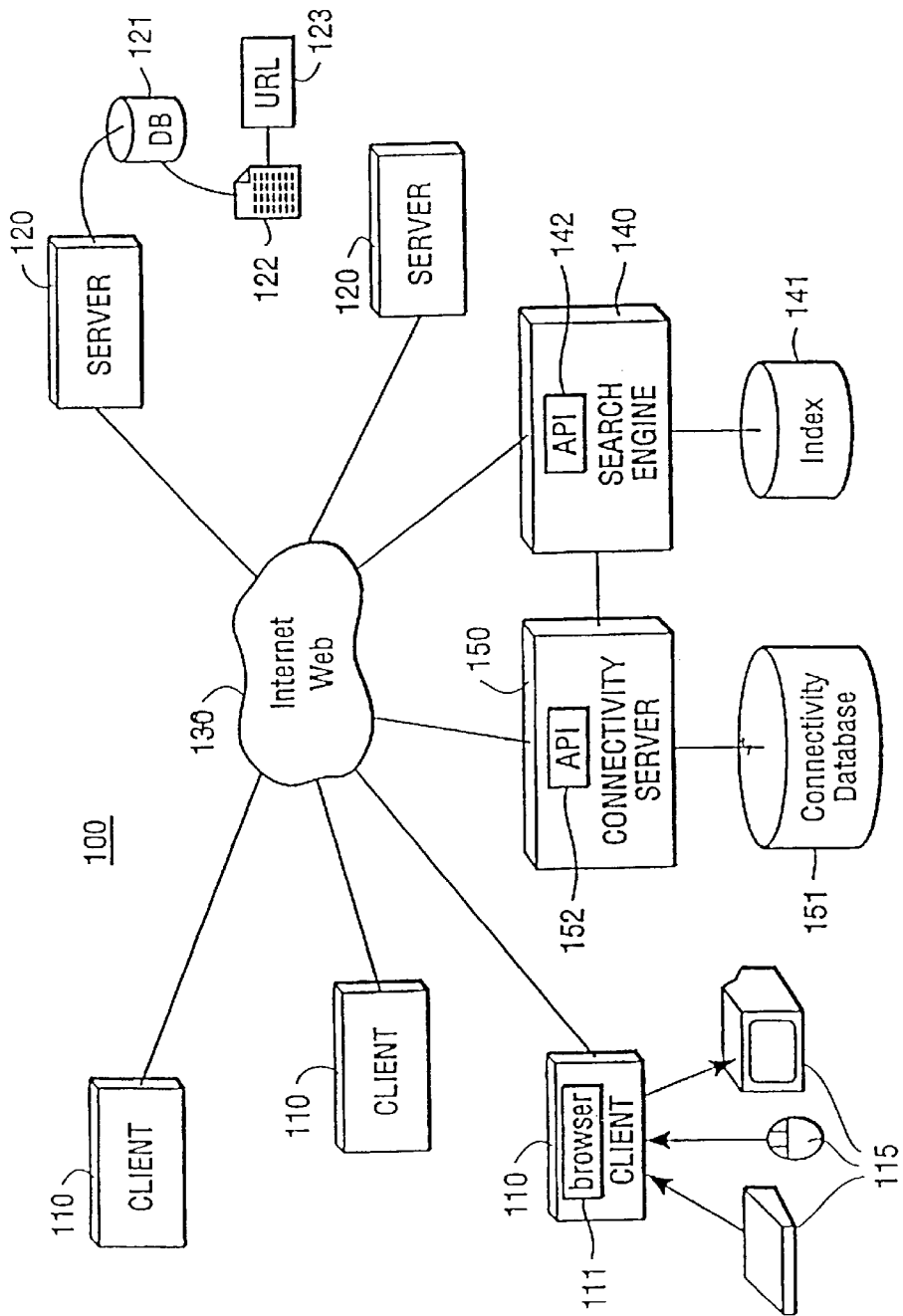
FIG. 1 is a block diagram of a distributed computer network in which various clients 110 are coupled through the Internet to various servers, including an earlier-generation connectivity server 150, and to a search engine 142.
Figure 2:
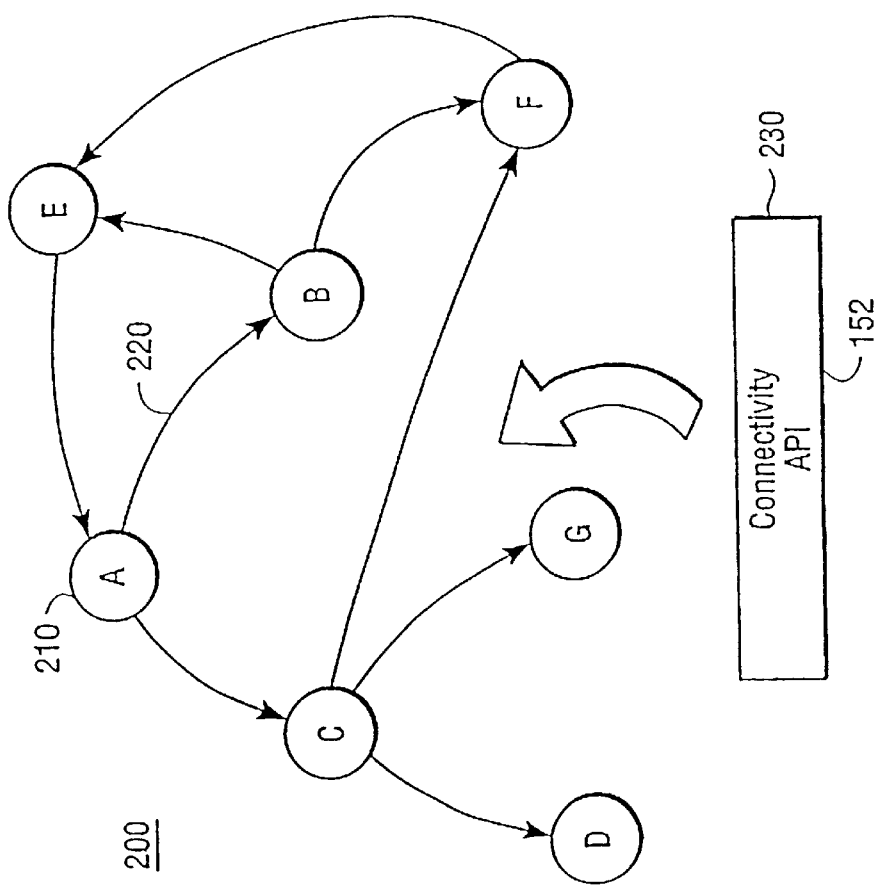
FIG. 2 is a graphical representation of the connectivity of a number of Web pages, corresponding to information that is stored in a connectivity server.
Figure 3:
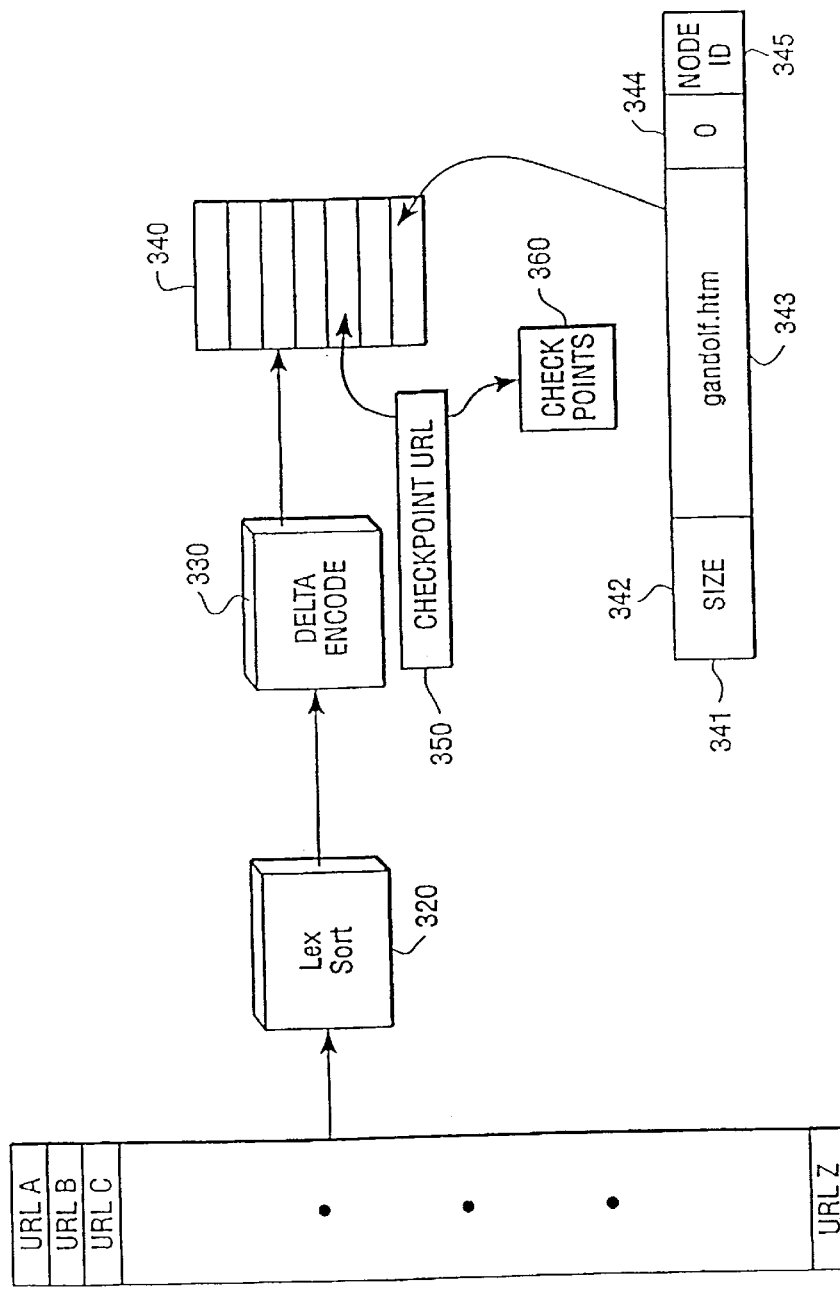
FIG. 3 is a flow diagram of the process employed by CS1 to encode names of Web pages (URLs).
Figure 4:
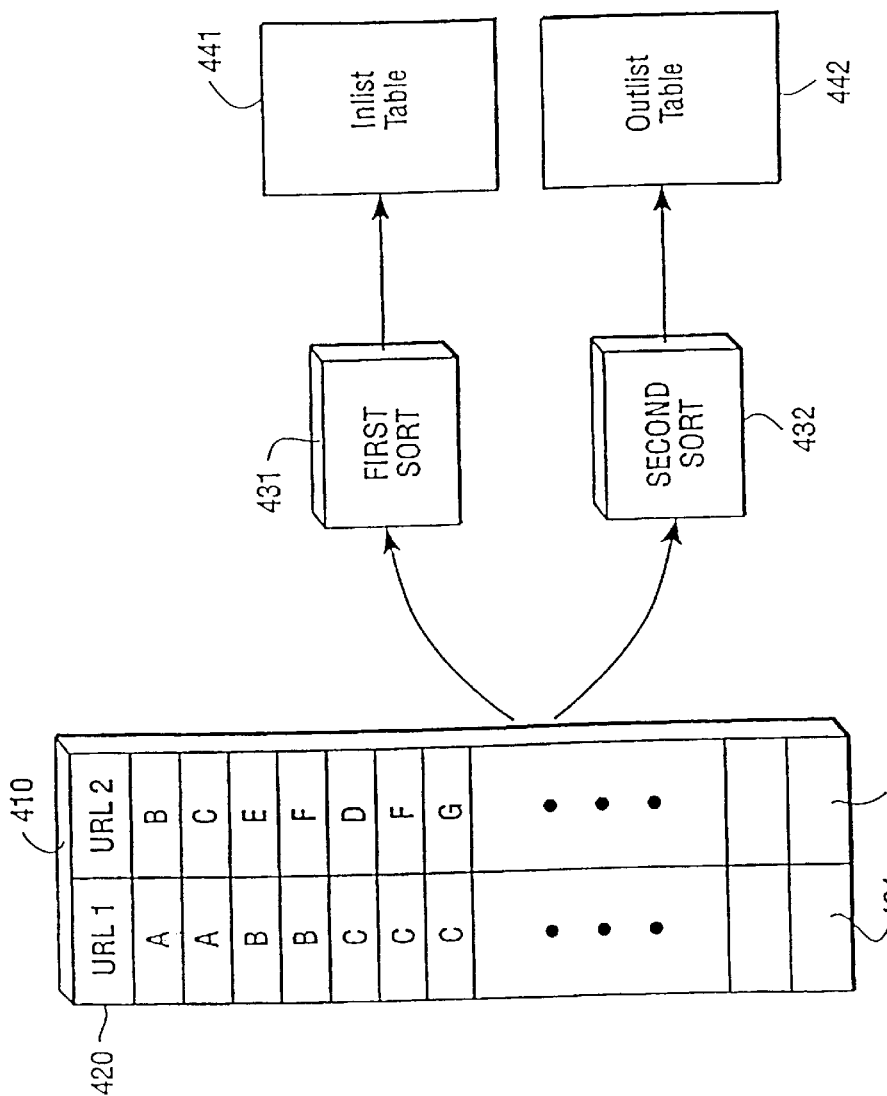
FIG. 4 is a flow graph depicting a process used by CS1 to generate an Inlist Table 441 and an Outlist Table 442, as those tables are constructed by CS1.
Figure 5:
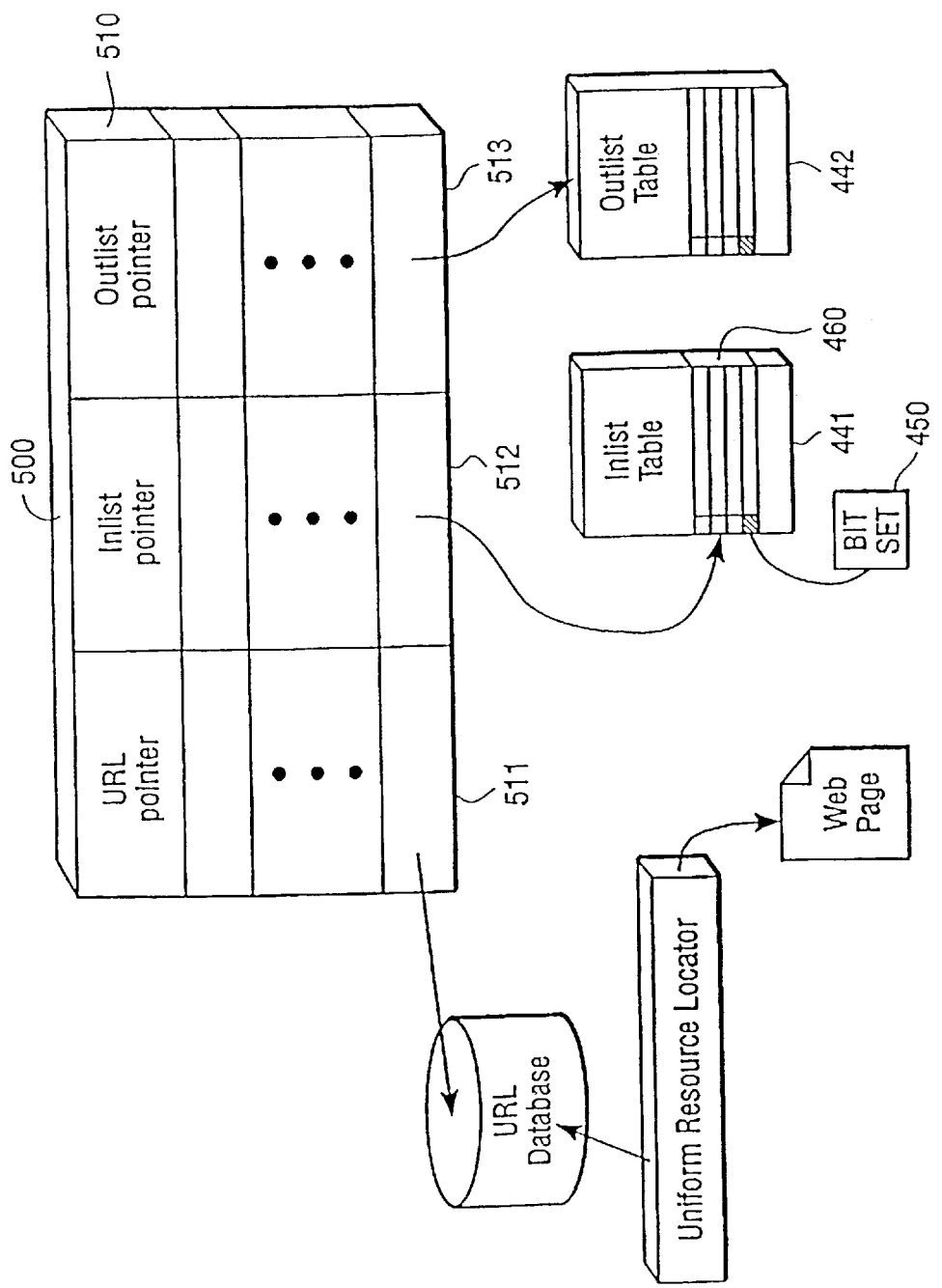
FIG. 5 is a block diagram of an array embodied in CS1 that constitutes a compilation and an arrangement of connectivity information.
Figure 6:
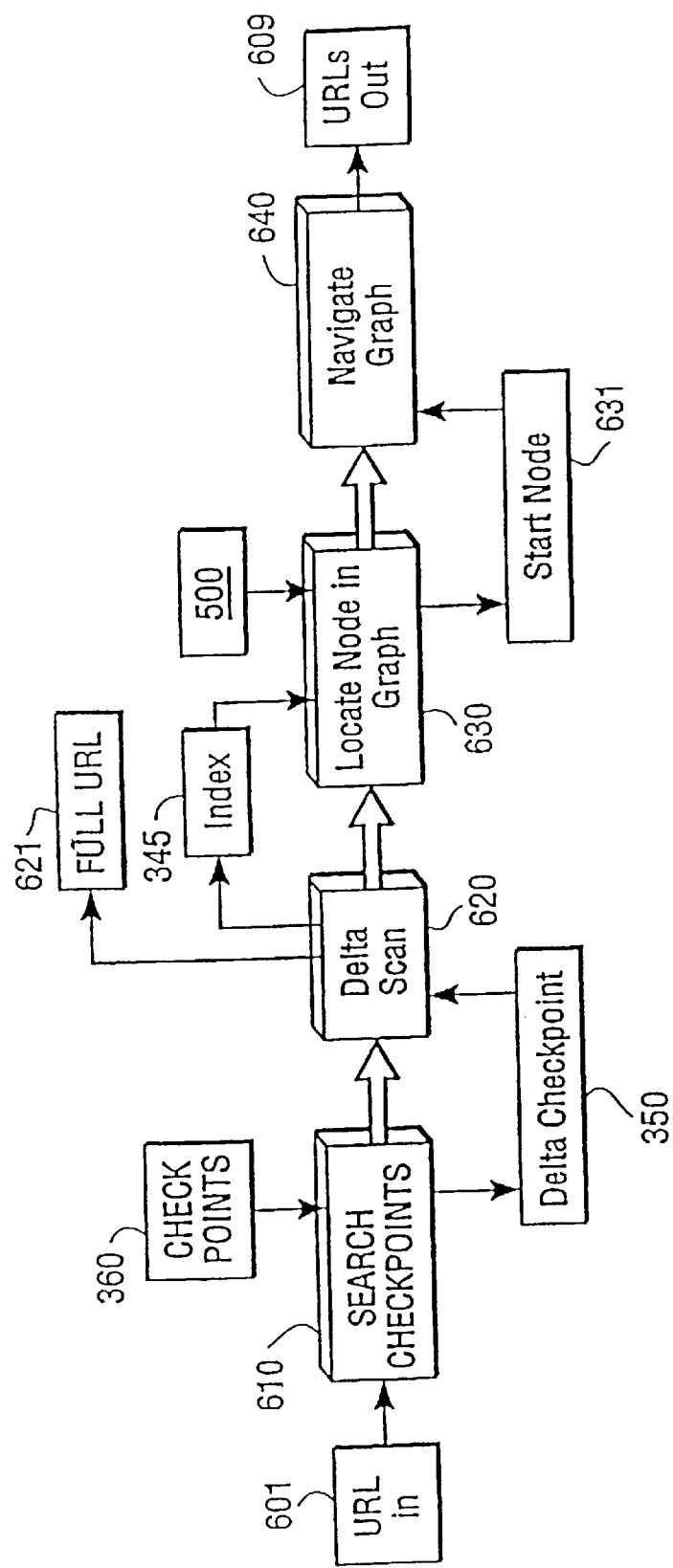
FIG. 6 is a flow diagram of process perform by CS1 in locating a node in an interconnected set of web pages, as exemplified in FIG. 2, based on use of the array depicted in FIG. 5.
Figure 7:
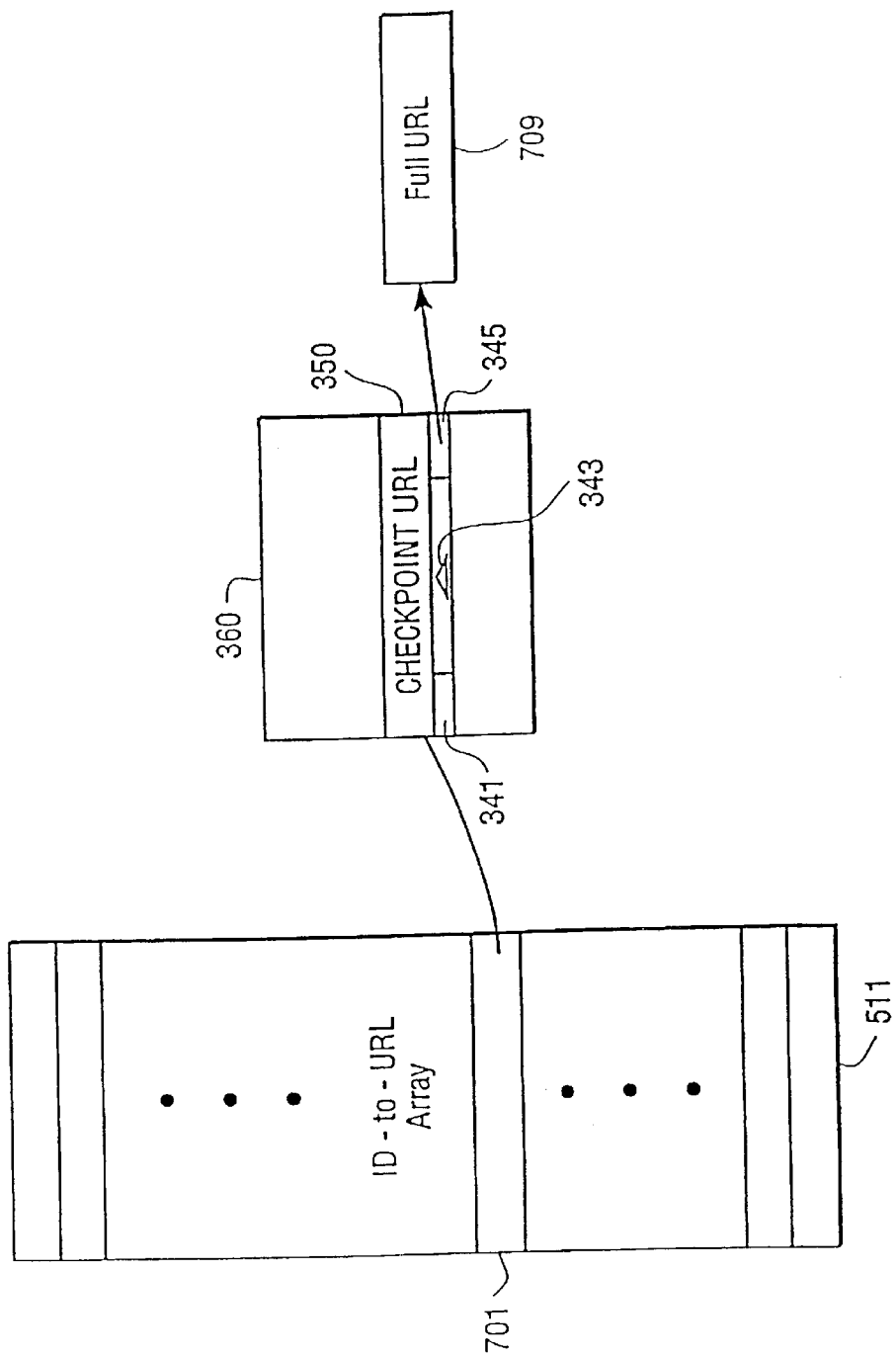
FIG. 7 is a flow diagram of a process used in CS1 for translating node identifications to a URL of a Web page.
Figure 8:
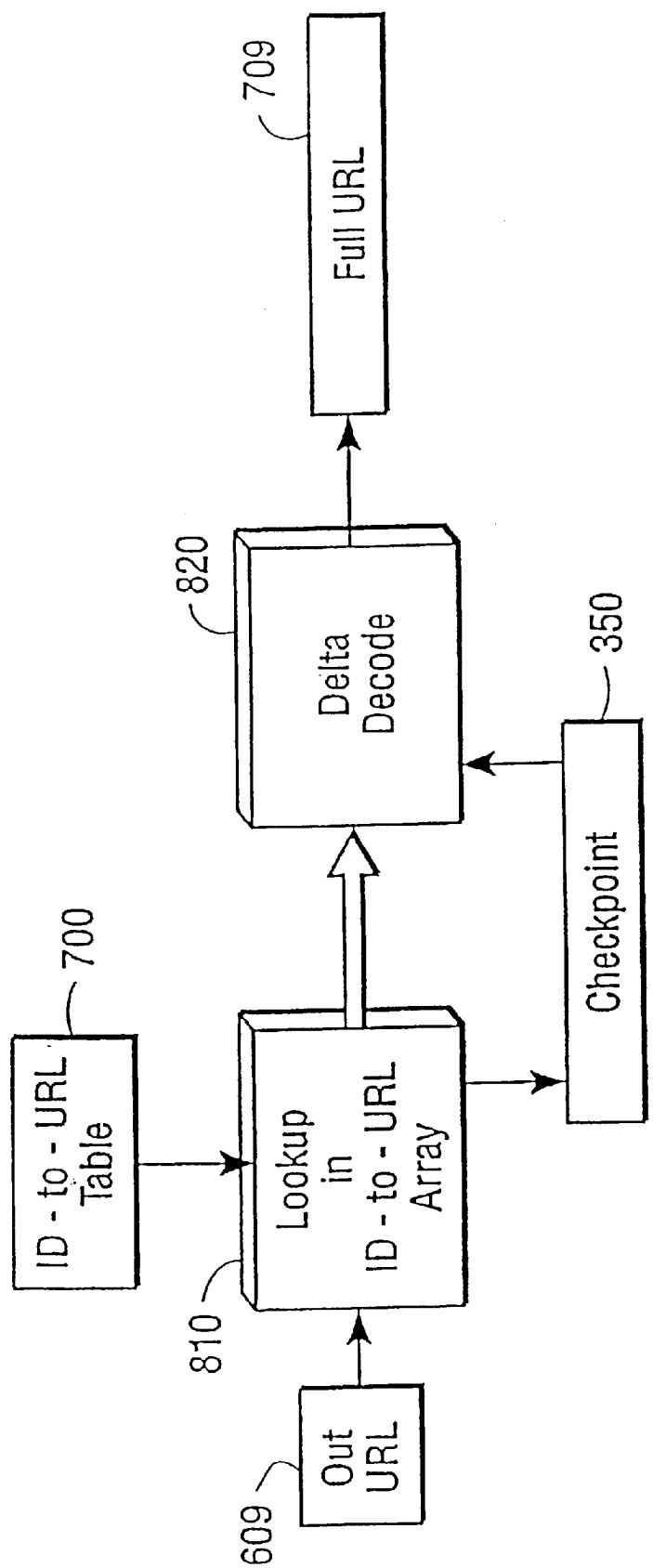
FIG. 8 is a block diagram of CS1.
Figure 9:
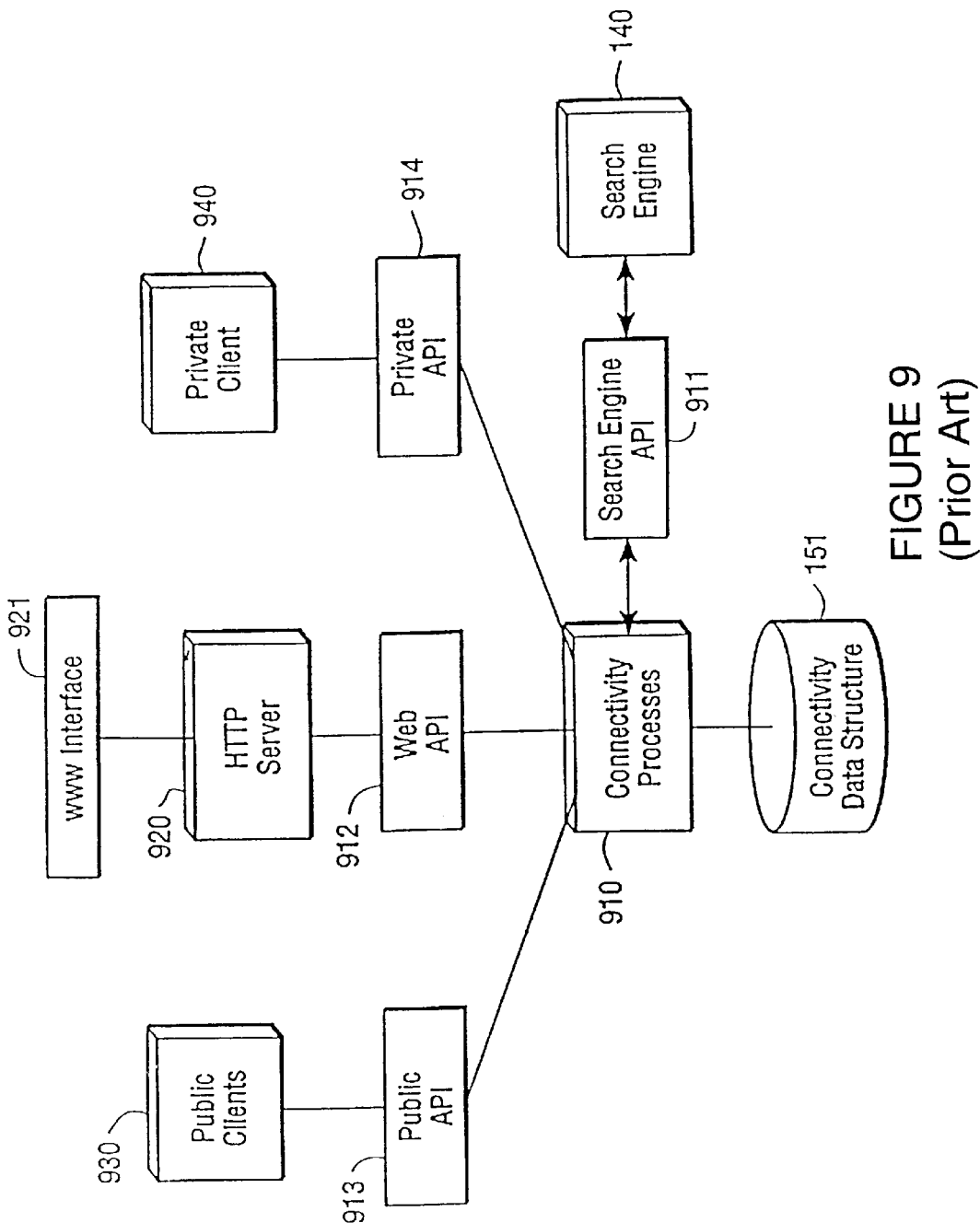
FIG. 9 is a block diagram of an exemplary embodiment of the operating environment of a connectivity server, including the connectivity server described herein.
Figure 10:
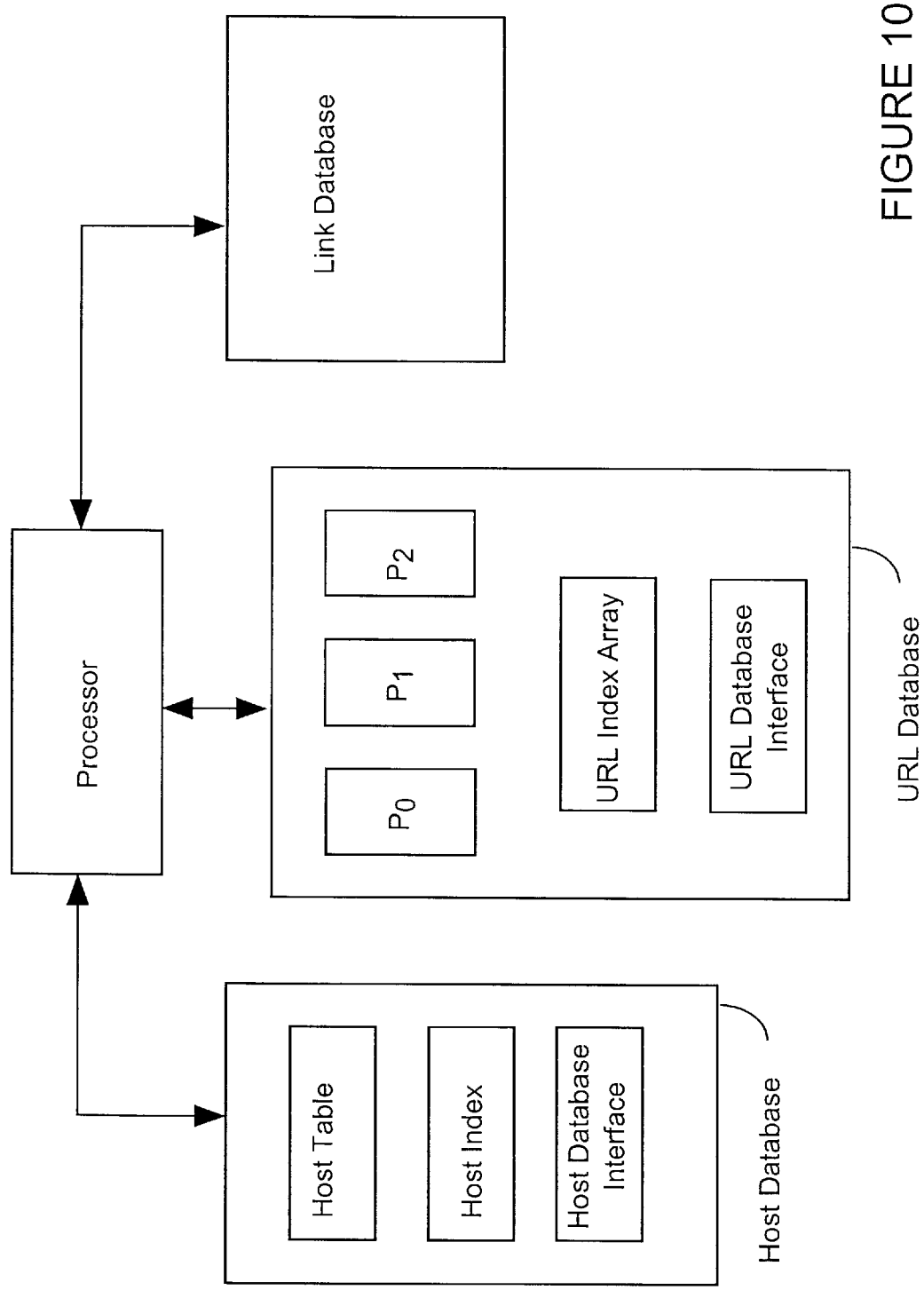
FIG. 10 is a system block diagram depicting a connectivity server that includes a URL Database, a Host Database, and a Link Database.

As depicted in FIG. 10, one embodiment of the invention comprises a connectivity server that includes a URL database, a Host database and a Link database. The URL database stores URLs; the Host database stores information about the URLs; and the Link database stores information about links between the URLs. The connectivity server stores the information, in specialized data structures that will be described in detail below, and controls access to the URL, Host and Link databases. In one embodiment, all the databases are stored in RAM resident on a single processor. In this form, access to the URLs and links is fact enough to enable applications that touch every link, even multiple times, to execute, in real time, in minutes or hours.

For example, on a processor such the AlphaServer 4100 (available from Compaq Computer Corporation; Houston, Tex.) with 8 Gb RAM, 1.5 B links may be stored in a memory space 5.9 Gb. Access to each link requires only 0.15 microseconds. Consequently, one iteration that over all the stored links can be accomplished in less than four minutes. Similarly, 200M URLs may be stored in less than 4 Gb, and each URL may be retrieved in less than 85 microseconds. Applications that benefit from this capability include static ranking of pages (eigenranks), query pre-computation, mirror-site detection, and related-page identification. In a manner to be described below, the connectivity server is characterized by data structures that implement data compression effective to store the crawled portion of the Web in RAM: that is, 300M URLs and 2B links in approximately 13 Gb.

I. System Design

The design and operation of the subject Connectivity Server (hereinafter "CS2"), including a URL database, HOST database, and LINK database are described, seriatim, below.

1.0 URL Database 1.1 Functionality

The URL Database stores all URLs and associates with each URL a 64-bit fingerprint (FP) and a unique 32-bit internal identifier (CS_id).

The URL Database includes an interface that translates between pairs of associated URLs, FPs and CS_ids. That is, the interface functions, inter alia, as a URL-to-FP, URL-to-CS_id, FP-to-URL, FP-to-CS_id, CS_id-to-URL, and CS_id-to-FP translator.

The URL index is an index from compressed URLs to CS_ids, and the CS_id index is an index from FPs to CS_ids. URL-to-FP translation may be accomplished through a deterministic mathematical function. In one embodiment, the function is a hash function that returns a unique 64-bit integer corresponding to each unique URL string, for up to $2^{32}$ strings. Many such functions are known to those skilled in the art, and all such functions that have the requisite uniqueness characteristics are candidates for use in the context of the subject invention. In addition, similar mathematical functions exist to return the maximum and minimum CS_ids. CS_ids are consecutive between the minimum and the maximum.

1.2. Partitioning

In one embodiment, URLs are stored in the URL database, which is divided into N partitions of unequal size. The allocation of a URL to a partition is based on the "importance" of the URL. Specifically, URLs in Partition 0 are considered most important. In one embodiment, there are three partitions, that is N=3. The "importance" of a URL is commensurate with the indegree and the outdegree of the URL. The outdegree of a URL is equal to the number of links emanating from the URL. Conversely, the indegree of a URL is equal to the number of links pointing to the URL. In one embodiment, Partition 0 is occupied by URLs with indegree or outdegree greater than or equal to 255. Partition 1 is occupied by URLs with indegree or outdegree greater than or equal to 16, but less than 255; and Partition 2 is occupied by with the remaining URLs. It has been empirically determined that the URL population, as a percentage of all URLs, for Partition 0, Partition 1, and Partition 2 is, respectively, approximately 0.4%, 19% and 81%.

Within each partition, URLs are sorted lexicographically, and CS_ids are assigned to the URLs sequentially, starting with Min(CS_id) in Partition 0 and Max(CS_id+1) for Partition (N−1), that is, Partition 2 in the instant embodiment. Therefore, within each partition, consecutive CS_ids correspond lexicographically to similar URLs. In particular, URLs share a common prefix.

1.3. URL Compression

The compressed URL data structure stores the URLs in chunks of M URLs. Each chunk of URLs is compressed separately. First, the URL scheme "http://" is discarded, thereby reducing the length of the URL by seven characters. Second, a prefix compression is applied. The prefix compression writes a 0 followed by the entire first URL. For each subsequent URL, $URL_i$, where $i \geq 1$, the prefix compression writes a one-byte integer having a value between 0 and 255. The integer represents the length of the common prefix shared by $URL_1$ and $URL_{1-1}$, followed by the remainder of $URL_i$, after the common prefix. In one embodiment, the prefix compression reduces the average URL length about 67%, from 44 to 14.5 bytes. FIG. 11 shows seven consecutive URLs in Partition 0, before and after the prefix compression. Third, a second compression routine is applied to the prefix-compressed chunk of URLs. On an exemplary data set, the second compression routine is performed in accordance with the ZLIB Compressed Data Format Specification, Version 1.1.3. The second data compression reduces the average length of URLs another 37%, to 9.2 bytes per URL. Chunks of doubly-compressed URLs with consecutive CS_ids are stored in contiguous bytes in the URLs files. A separate file is supported for each partition.

1.4. URL Index

Figure 12:
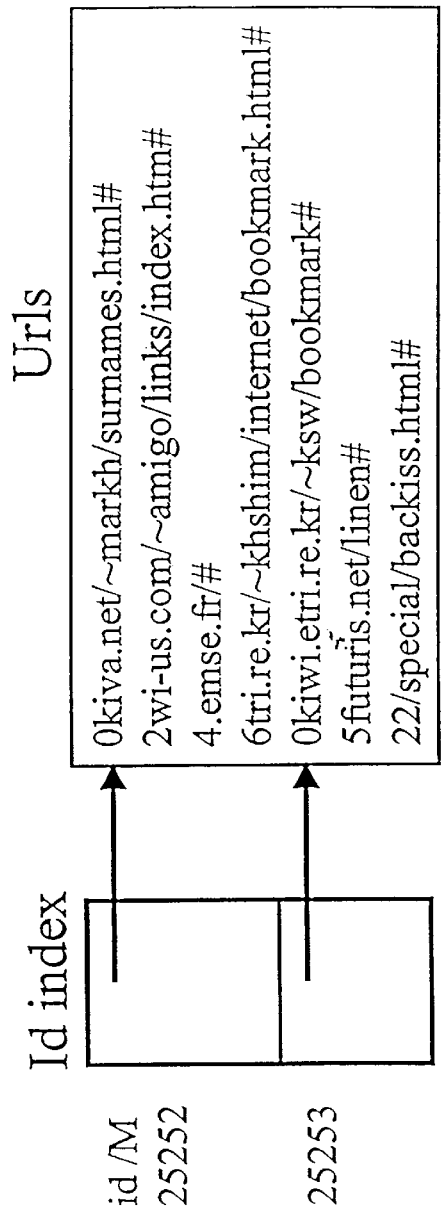
FIG. 12 is a graphical depiction of the manner in which the ID Index Array maps into compressed URLs in accordance with the subject invention.

The URL Index is an array with one entry per chunk of M URLs. Each entry logically points to a compressed chunk of M URLs by containing the byte offset of that chunk from the start of the compressed URLs file. FIG. 12 shows the URL Index for the URLs in FIG. 11. In one implementation, the URL Index is an array of 64-bit integers. The array indexes are a function of the CS_ids contained in the chunk, M, and the Min[CS_id ] for that partition. In accordance with this embodiment, the URL with CS_id=i may be identified by locating the chunk pointed to by URL index ((i-Min[CS_id ])/M]. The URL Index is written separately for each partition.

1.5. ID Index

The ID Index is a hash table that maps from fingerprints to CS_ids. The hash table has a multiple of $2^{24}$ buckets, and the hash key is the high (most significant) 24 bits of the fingerprint. Only the remaining 40 bits of the fingerprint and the CS_id are stored in each entry in the hash table. Each primary bucket of the hash table is 32 bytes long and contains three entries (at most), a count of the number of entries in the bucket, and a logical pointer into an overflow table. The overflow table is an array of entries sorted by bucket. The pointer is the array index of the first overflow entry for that bucket. All overflow entries derived from a single bucket are contiguous. Although entries are logically stored one after the next, physically, groups of (3 in the primary bucket, 4 in the overflow) entries are stored together: first all of their CS_ids, then the low 32 bits of all of their fingerprints, then the remaining eight bits of the fingerprints. This approach minimizes, or even obviates, the space wasted by data alignment. FIG. 13 depicts a portion of an exemplary bucket.

To find the CS_id corresponding to a fingerprint, the most significant 24 bits are used to choose a bucket, and then the entries in the bucket are searched sequentially to find a match. If there are greater than three entries, then the count is used to limit the number of entries searched in overflow. Within each bucket, the entries are sorted by decreasing indegree. In this manner, it is anticipated that the most frequently accessed entries will be found fastest.

2.0 Host Database

2.1 Host Functionality

The host database associates a unique 32-bit internal host identifier, Host_id, with each distinct hostname in the URL database. A hostname is the portion of the URL after "http://" and before the next "/". The hostname may include a port number. Every URL and CS_id in the database maps to exactly one Host_id. The Host Database interface includes functions that accept a CS-id and return a Host_id and that accept a Host_id and return either the number of URLs on that host or the CS_id of (at most, N) URLs on that host, for a user-defined N. Host_ids are not densely packed. However, the Host database interface also has the capability to return the first Host_id and the "next" Host_id.

2.2 Host Table

The Host Table data structure comprises four columns of four bytes each. The columns include the starting CS_id of a consecutive series of CS_ids on the same host, the number of CS_ids in the series, the Host_id for the series, and the row number of the next highest table row with the same Host_id. A Host_id is the row number of the first table row with CS_ids on that host. The table rows are sorted by starting CS_ids in ascending order. FIG. 14 shows a Host Table. Note that Row 0 is always empty.

In one embodiment, the variable P is a predetermined integer chosen to effect a balance between the size of the Host Index and the number of Host Table entries that might be searched after a single Host Index lookup. The Host Index has nURLs/P entries. The number of Host Table entries to be searched after a lookup is nURLs/(nhosts*P), where, in at least one dataset the quantity (nURLs/nhosts) is equal to approximately 50.

2.3 Host Index

Figure 15:
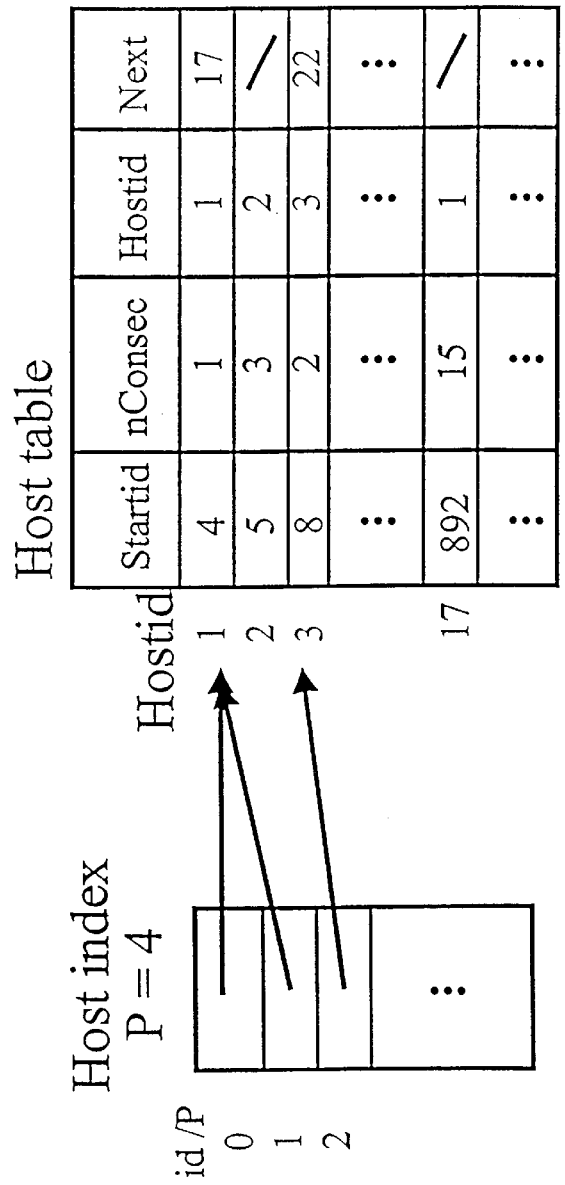
FIG. 15 graphically depicts the manner in which the Host Index and Host Table are used to find a Host_id for a given CS_id.

The host database also includes a Host Index. The Host Index is an array of nURLs/P entries. Each array entry i contains the largest host table row number whose starting CS_id is less than or equal to (i*P). To find the Host_id for a given CS_id, the connectivity server requires one lookup in the Host Index to find a row. Then the Host Table is scanned sequentially starting from that row number until the correct row is found. FIG. 15 shows a Host Index and Host Table with P=4.

3.0 Link Database

3.1 Link Database Functionality

The Link Database stores all links. Each link extends between a source URL, A, and a destination URL, B. A link is stored in both directions, that is, as an outlink of A and as an inlink of B. The Link Database interface operates to retrieve, for a given CS_id, the number of associated outlinks or inlinks, as well as the CS_id of a user-specified number of outlinks or inlinks. When retrieving outlink CS_ids or inlink CS_ids, the Link Database interface provides the option of retrieving either the Host_id of each CS_id, or a Boolean value that indicates whether the respective outlink or inlink resides on the same host as does the input CS_id.

3.2 Link Database Structure

Figure 16:
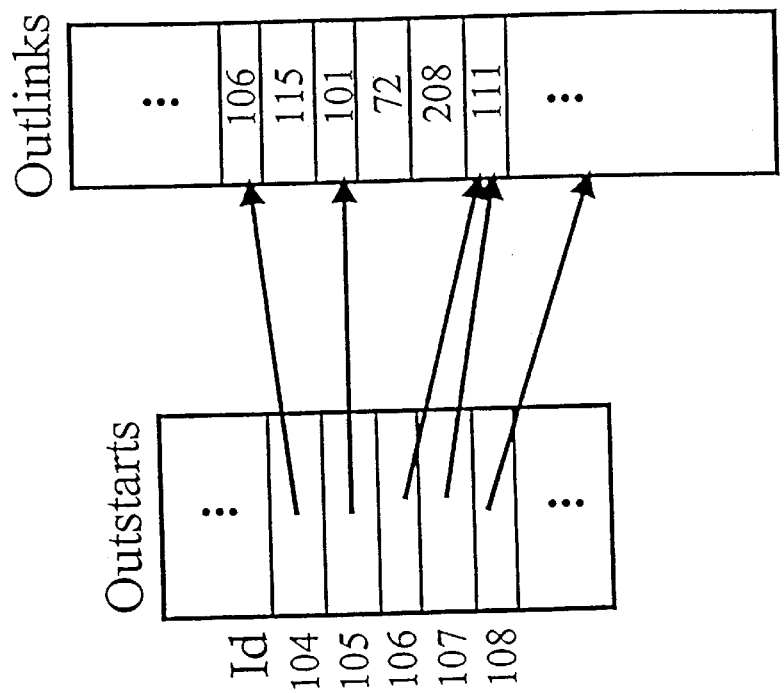
FIG. 16 illustrates the logical structure of the outstarts array and the outlinks array, before compression.

Logically, the outlinks are stored in two arrays. An array of "starts" is indexed by source CS_id, and contains elements are offsets in an array of "links". The elements of links array are the destination CS_ids. The outlinks of CS_id A are stored in links[starts[A]] to links [starts[A+1]−1]. The outlinks of a given CS_id are stored in the same order as they appeared on a page, after duplicate links are removed. Logically, inlinks are stored the same way as outlinks. However, the inlinks of a given CS_id are stored in sorted ascending order by inlink CS_id. FIG. 16 shows the logical structure of the outstarts and outlinks arrays, before compression.

3.3 Links Array Compression

Figure 17:
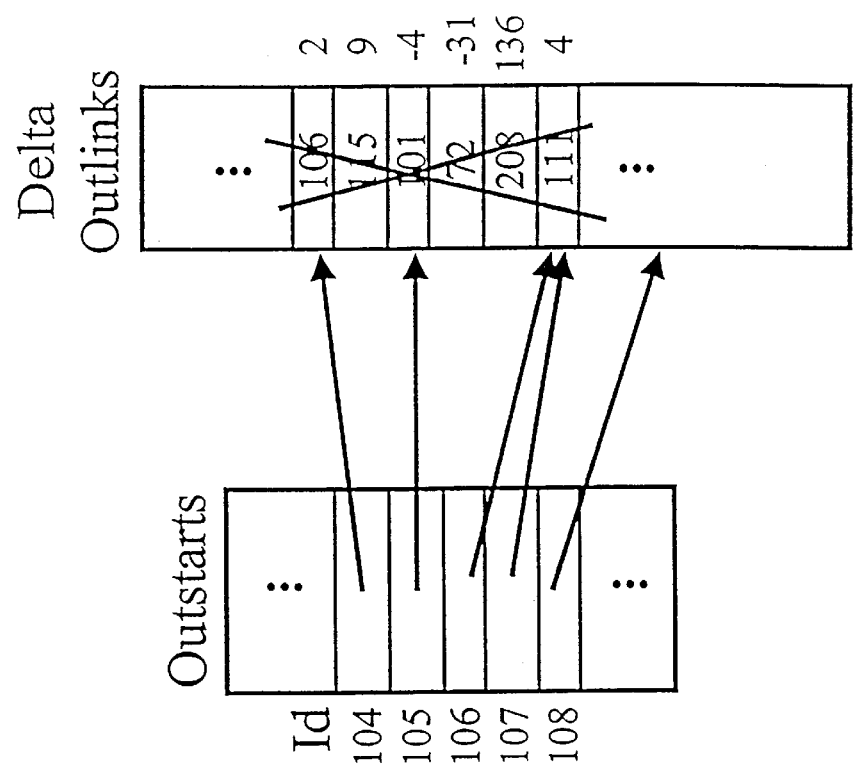
FIG. 17 illustrates the stored delta values for the outlinks illustrated in FIG. 16.

Physically, both the starts and links arrays are compressed and divided by partition. The outlinks link array entries are first rewritten as delta values. The first destination CS_id B in links [starts[A]] has a delta value of B−A. The remaining destination CS_ids in links [i] have delta values of links [i]-links[i−1]. Delta values fall in the range [CS_id_minid−CS_id_maxid] to [CS_maxid-CS_id_minid]. That is, some delta values may be negative numbers, although all CS_ids are positive. Therefore, the maximum number of bits needed to store a delta value is 33, not 32, assuming that only one bit is used to store the sign. The delta values are then compressed using a fixed-bit compression scheme, so that they use a variable number of bits, dependent on the delta value. FIG. 17 shows the delta values for the outlinks in FIG. 16.

Figure 18:
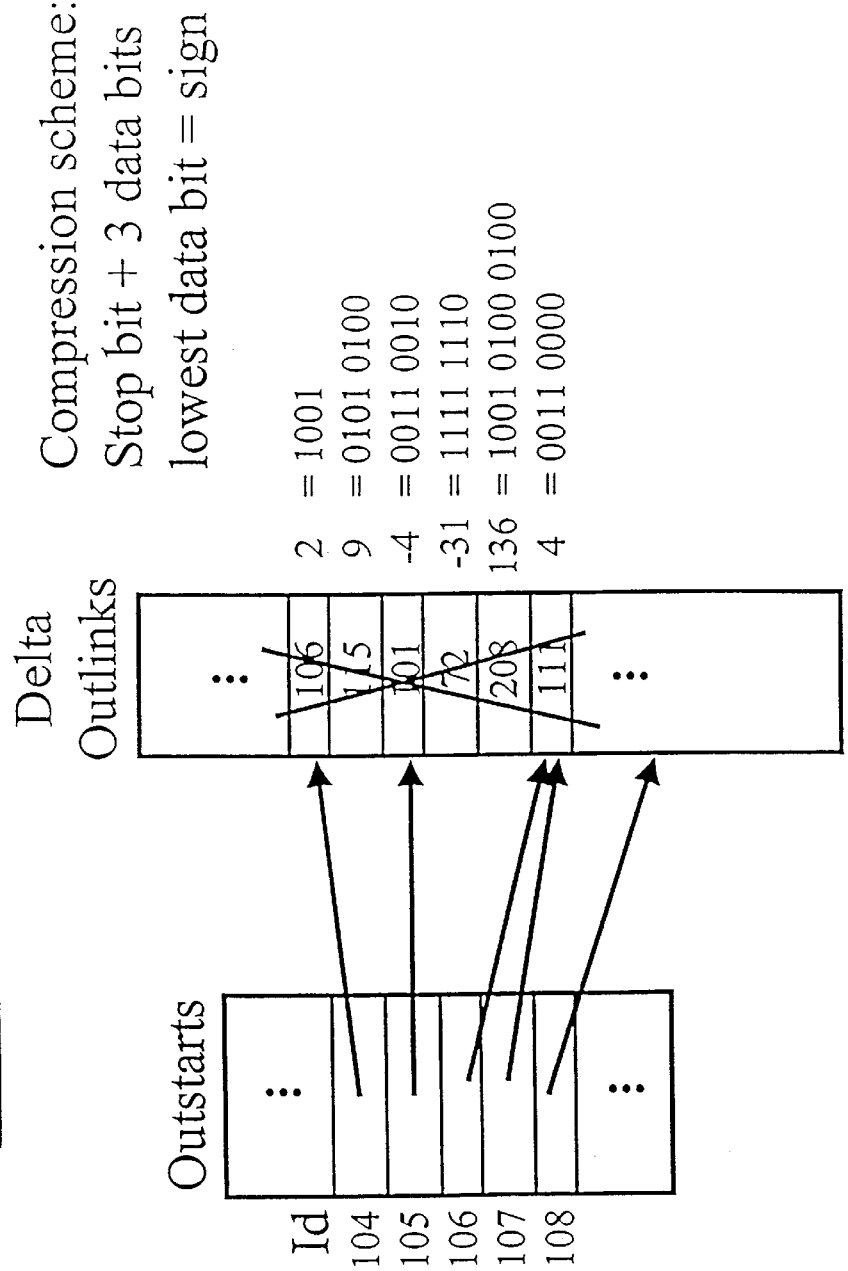
FIG. 18 illustrates the sizes of bit-compressed delta values in the outlinks array.

In one embodiment, the bit compression scheme stores values in multiples of four bits. Each four-bit multiple contains a stop bit and three data bits. For each value stored in 4N bits, the first (N−1) stop bits are 0 and the $N^{th}$ stop bit is 1. The 3N data bits store the delta value. As a result, small numbers can be stored in a small number of bits. Each value is first encoded using a sign and magnitude scheme. The low (least significant) bit is the sign, and the remaining bits are the magnitude or absolute value. The value is then divided into groups of three bits, and the stop bits are added. The maximum size of a bit-compressed delta value is 33 data bits, plus 11 stop bits, represented in 11 four-bit quantities. FIG. 18 shows the sizes of the bit-compressed delta values for the outlinks in FIG. 16.

The inlinks link array is similar to the outlinks link array and stores the source CS_ids A that have links to a given destination CS_id B. However, since inlinks are stored in ascending CS_order, only the first delta value for a given CS_id B can be negative. In one embodiment, therefore, no sign bit is stored for the remaining source delta values.

A separate inlinks and outlinks link array is stored for each URL/CS_id partition. The starts offsets to compressed link arrays contain offsets of four-bit quantities. Therefore, each array is further subdivided if it exceeds $(4)(2^{32})$ bits, so that all compressed values begin at an offset less than $2^{32}$ from the start of the array.

3.4 Starts Array Compression

In one embodiment, there is provided one starts array corresponding to each link array. Each starts array entry is an array offset that can be represented in 32 bits. Each starts array is compressed by dividing the array into groups of Q entries. Because in Partition 0, there are an unlimited number of both outlinks and inlinks, there is no maximum difference between successive offsets. No compression is imparted to the starts arrays. Inasmuch as the starts arrays for the outlinks and inlinks are identical, hereinafter in this Description only the outlinks starts array will be referred to.

In Partition 1, there are at most 254 outlinks or inlinks. Since each outlink is stored in at most 11 four-bit quantities, the maximum difference between two consecutive offsets is 254*11=2794, which can be stored in 16 bits.

Figure 19:
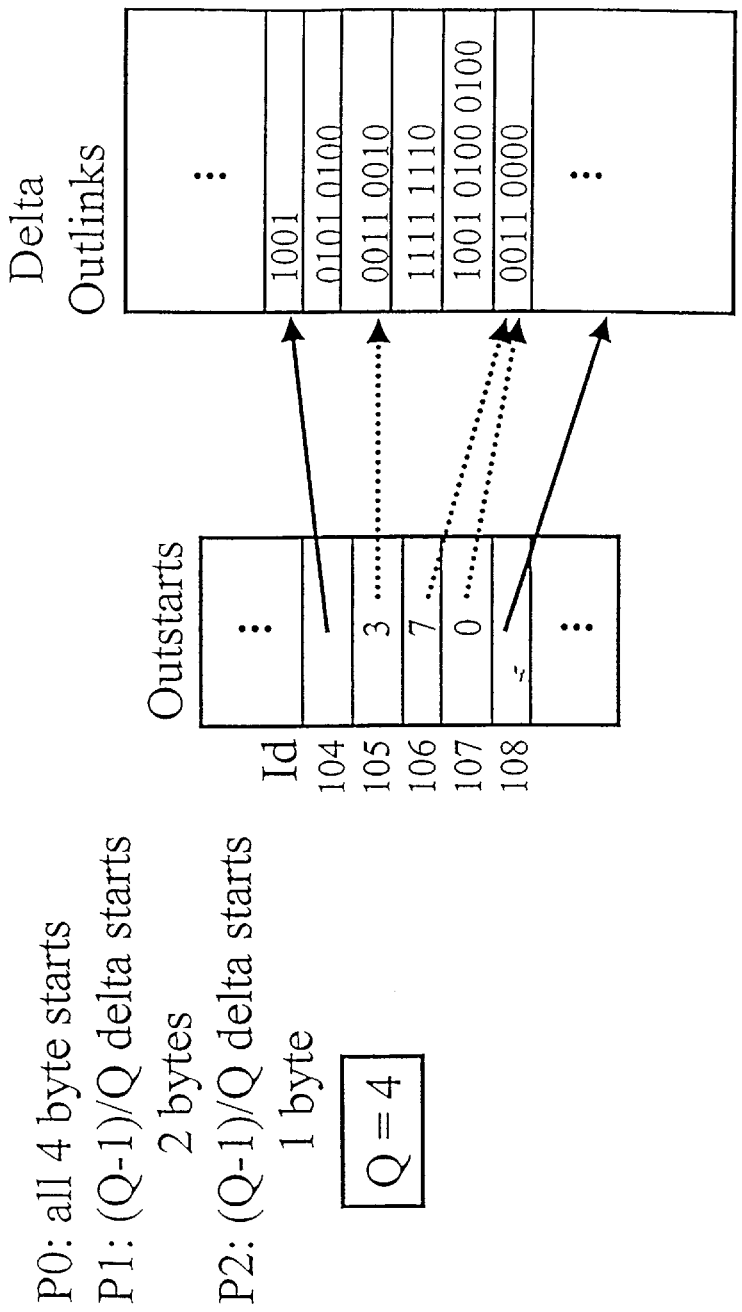
FIG. 19 depicts the delta outstarts corresponding to FIG. 18, when each starts array is compressed by division into groups of, for example, four entities.

In partition 2, there are at most 15 outlinks or inlinks. Since (15*11)=165, which is less than 255, the delta offsets can be stored in eight bits. The scheme for Partition 2 is otherwise identical to the scheme for partition 1. FIG. 19 shows the delta outstarts for FIG. 18 when Q=4.

II. Database Construction

A set of compressed ASCII links files forms the input to the construction methodology (algorithm) that is used to compile the CS2 databases. In each links file there exists a series of source URLs. Each source URL is followed by a (possibly empty) list of corresponding destination URLs. The links files are provided filenames that include timestamps, so that a lexicographic sort of the filenames yields the files in chronological order. The input to the construction algorithm may optionally include an ASCII list of URLs that may, for any one of a number of reasons, be deemed "special". For example, URLs in AltaVista's current index are deemed special URLs.

The output of the construction process constitutes the CS2 data structures, as have been described above. Those data structures store all URLs that appear (i) as a source URL in the input files, (ii) as a destination URL in the input files at least K times, where K is an integer greater than 0, or (iii) appear as a destination URL at least once and are in the special URLs file. All other destination URLs in the input files are discarded or ignored (Note, however, in order to include all destination URLs that appear in the input file, it is necessary only to set K=1.) In addition, all links between two stored URLs are stored. Links to a destination URL that is discarded are similarly discarded.

The build algorithm comprises several Phases, which are described seriatim below. In each Phase, effort is directed toward building at least one, but sometimes more than one, data structure. Temporary data structures that are created in the construction of permanent data structures are also described below.

3.1 Phase One

In the Phase One, a temporary URL_info data structure is created. This data structure assumes the form of a hash table whose keys are the most significant 24 bits of a 64-bit URL fingerprint. Each record in the URL_info Table contains the remaining 40 bits of one unique URL fingerprint, plus associated metadata. The associated metadata includes: the indegree of the URL; the outdegree of the URL; and Boolean values that indicate (1) whether the URL has been a source URL in an input file, (2) whether the URL appears at all in the input files, and (3) whether the URL is in the special file. As an alternative, an outdegree may be represented by a pair of Boolean values that indicate an outdegree magnitude greater than or equal to 16 or an outdegree magnitude greater than or equal to 255. The hash table has a multiple of $2^{24}$ buckets. In the current implementation, each bucket is 64 bytes deep and has storage for eight entries and a pointer to overflow. The URL_info Table is initially empty.

If a special URL file is part of the input, it is read at the end of Phase One. The fingerprint for each URL in the file is stored in the URL_info Table.

Providing a special URL file as input is an enhancement in CS2. CS1 does not qualify URLs included in a build. In addition, the maintenance of statistics on URLs as the URLs are read in the input files is new in CS2. These statistics may then be the predicate for prospective decisions, such as which URLs are to be retained and which URLs are most "important."

3.2 Phase Two

In Phase Two, the links files are read, backwards and in reverse chronological order. As a result, if a source URL appears multiple times (representing, for example, multiple crawls of the same page), then the initial reading of a URL in the links files corresponds to the most recent crawl. It, and its destination URLs, are ignored all other times. Although the files are processed sequentially to preserve strict reverse chronological order, URLs are decompressed in advance by a separate, parallel thread and are written to a buffer for processing.

The fingerprint of each URL is computed and added to the URLs_info Table, assuming it is not already present. For each source URL, its outdegree is stored and the Boolean values corresponding to "appears" and "source" are set to TRUE. For each destination URL, its indegree is incremented by one, and the Boolean "appears" is set to TRUE. In addition, the first time a URL is either a source or has indegree = = K and is not a "special" URL, it is written to a URL-sort buffer. URLs that are written because their indegree = = K are also written to an "K-URLs" file. The "K-URLs" file identifies potentially important URLs that may not have been crawled.

Destination URLs are counted only once per source URL, and then only if the destination URLs are different from the source URL. For each source URL, its fingerprint, its outdegree, and a list of the destination URL fingerprints are written to the fingerprint-links file. The fingerprint-links file is essentially a copy of the links files, but without duplicates, without compression, and with URLs already converted to fingerprints. It consumes approximately half the number of bytes consumed by the compressed links files and, therefore, requires correspondingly less I/O to read in Phase Six. More importantly, the fingerprint-links file does not require decompression to read in Phase Six, therefore, conserving hours of CPU time.

The URL_sort buffers are a set of buffers of URLs. At any given time, URLs are written to one buffer. When that buffer is full, it sorted and then written to disk by a separate, parallel thread. The buffer is then empty. Each full, sorted buffer that is written to disk constitutes a "run". As a run is written to hard disk, other URLs are written to a different buffer. In one implementation, there are four buffers. The buffers consume all remaining available storage capacity after storage has been allocated to the URLs_info table.

The input links files are compressed with gzip. In CS1, the files are decompressed by invoking gzip as a system call through a pipe. This method creates a separate process for each call to gzip. In CS2, the files are decompressed using zlib library functions directly into a buffer in the same process. That is to say, decompression is performed by a separate thread.

In CS1 the links files are read in chronological order. Consequently, if a URL appears as a source URL twice, then the two sets of outlinks are merged. However, the most likely reason for a duplicate URL appearance is that the URL was crawled twice. It is preferable to retain only the more recent set of destination URLs. In CS2, the links files are read in reverse chronological order, and bookkeeping is simplified by retaining only the most recent copy of a page, that is, the copy read first.

More sophisticated sorting of URLs in CS2 vastly reduces the disk space and processing time required to sort. In CS1, the set of URLs required to be sorted includes each URL, as many times as a URL appears in the links files. In CS2, a URL is included at most once, since each URL in the links files is "remembered" in the URLs_info Table. A URL is not included at all if it is considered "junk" and is not included in the URL Database. About 60% of the distinct URLs in the links files are considered junk. In CS1, all sorting is done by the Unix utility sort, in a phase separate from writing the URLs. Using Unix sort requires two copies of the URLs files, and hence twice as much disk space. In CS2, most of the sorting is done before the URLs are written at all, by a C function that is faster and sorts in place, so that no extra disk space or memory is required. In addition, the sorting is done concurrently with reading the links files.

3.3 Phase Three

In Phase Three, the ID Index is created and initialized from the URLs_info Table, with all the fingerprints the Index will contain. A fingerprint is copied from the URLs_info Table if it has a true "source" Boolean or it is both "special" and "appears," or it "appears" and has indegree >=K. In the slot for a CS_id, which has not yet been assigned, the partition number for the CS_id is stored. The partition is based on the URL fingerprint's indegree and outdegree, which are known. Therefore, the URLs_info Table is not needed later to determine the partition.

Since the URLs_info Table and ID Index are hash tables with the same number of buckets and the same hash function, the buckets can be copied from the URLs_info Table in sequential order and written to the ID Index in sequential order. Therefore, it is not necessary that the ID Index reside in memory as it is being created.

During the creation of the ID Index, a count of the number of URLs in each partition is maintained. Subsequent to Phase Three, the URLs_info Table is no longer needed. The counts are used to allocate the CS_ids in each partition.

As created, the URL Database contains only URLs from the links files that either are source URLs, are in the special URLs file, or appear as destination URLs at least K times. In CS1, all URLs in the links files were included. This filter implemented in CS2 reduces the number of URLs in the URL Database by 60%, the size of the URL Database by over 60%, and the instarts and outstarts tables by almost 60%.

When entries in the ID Index are created, the partition number for the to-be-assigned CS_id is stored in the space for a CS_id. Therefore, the URLs_info table is not needed in Phase Three. It is noteworthy that no URLs_info Table is available in CS1.

3.4 Phase Four

In Phase Four, the sorted runs of URLs are merged. For each merged URL, its fingerprint is computed and its partition is retrieved from the ID Index. The URL is assigned the next lowest CS_id in its partition, and the ID Index is updated. The URL is then is added to a URL partition. In each partition, after each M URLs are added, the chunk of M URLs is compressed and written to disk and a new URL Index entry is created.

In addition, during the merge, a preliminary Host Table is created. The preliminary Host Table has one 16-byte entry for each eventual Host Table entry. Each entry contains the starting CS_id of a series, the number of CS_ids in the series, and the HostFP. For each merged URL, a HostFP (fingerprint of the host and port number portion of the URL) is computed. If the HostFP is different from the previous HostFP for that partition, then a new preliminary Host Table entry is created for the previous HostFP. Merging of the sorted runs represents the last sorting step.

Merging is accomplished concurrently with compression and writing the URL data structures to disk. The preliminary Host Table is created concurrently with the final step of the sorting URLs.

3.5 Phase Five

In Phase Five, the (final) Host Table is created from the preliminary Host Table. First, the preliminary Host Table is sorted by CS_id. Then its entries are copied to the Host Table, leaving the Host ID and "next" columns blank. An index on the preliminary Host Table is created and is then sorted by the preliminary Host entry HostFP. The sorted index is then used to identify the Host Table entries with the same HostFP. That is, it is used to fill in the Host ID and "next" columns of the Host Table.

3.6 Phase Six

In Phase Six, the fingerprint-links file is read. Each fingerprint is converted to a CS_id. For each source URL, the set of destination URLs may now be pruned to include only those URLs that are stored in the URL database. Then the set of destination CS_ids is compressed and copied into the next available offset in the preliminary Outlinks Table. The preliminary Outlinks Table contains only compressed destination CS_ids. An entry is made for the source URL in preliminary Outstarts Table that contains the source CS_id, the compressed length of the destination CS_ids, and an offset into the preliminary Outlinks Table. In addition, a histogram of the number of inlinks for each CS_id is created. As each destination CS-id is read, the count of its inlinks is incremented.

The links files are decompressed and read only once. Rather than reading the links files a second time to extract the link information, during the first read the data files are rewritten with fingerprints instead of URLs and without gzip compression. This is achieved in approximately half the disk space of the original gzip'd ASCII files. This optimization saves hours of decompression and allows the fast conversion from fingerprints to CS_ids, rather than the much slower compression from URLs to CS_ids.

In CS2, the preliminary outlinks data is compressed when it is written, so it is smaller and faster to write and read. That is, the data is compressed to about 1.5 bytes per link. In CS1, the preliminary outlinks contains uncompressed (that is, about eight bytes per link) pairs of source and destination CS_ids.

The indegree histogram is created while reading the fingerprint-links files, rather than requiring a separate pass over the outlinks. No indegree histogram is available in CS1.

3.7 Phase Seven

In Phase Seven, the preliminary Outstarts Table and the preliminary Outlinks Table are converted to the outstarts and outlinks data structures. The preliminary Outstarts Table is sorted by CS_id. The Outstarts and Outlinks Tables are then created sequentially and written to disk as they are created. For each CS_id, the Outstarts Table entry compresses and stores the next available offset in the Outlinks Table. If there is an entry for that CS_id in the preliminary Outstarts Table, then the compressed links are copied to the next available offset in the Outlinks Table, and the next available offset is incremented. Different outstarts and outlinks files are created for each partition. In addition, whenever the next available offset exceeds $2^{32}$, a new pair of files is created and the next available offset is reset to zero.

In CS1, every pair of source and destination CS_ids must be sorted in order to write the Outstarts Table. Because the entire Outstarts Table includes a number of links to large to be stored in available memory, the construction algorithm breaks. In CS2, only the preliminary Outstarts Table must be sorted. Because the preliminary Outstarts Table contains at most one entry per CS_id (if the CS-id has any outlinks) rather than an entry derived from each link, the preliminary Outstarts Table in CS2 is easily accommodated by available memory.

3.8 Phase Eight

In Phase Eight, the instarts and inlinks data structures are created from the (inverse) link information in outstarts and outlinks. Each partition is processed separately. First, storage is allocated for uncompressed instarts and inlinks. Then, the indegree histogram that had been created in Phase 6 is scanned, and each instart is initialized for exactly the number of inlinks indicated by the histogram.

Then the entire Outstarts and Outlinks Tables are scanned in CS_id order. For each outlink from A to B, if B is in the current partition, then an inlink is added for B (to A) and instarts for B is incremented. At the end of the scan, inlinks is completely filled in, and the instarts entry for CS_id i now indicates the instarts value for CS_id i+1. The instarts entries are adjusted and then the instarts and inlinks tables are compressed and written to disk. Note that since the outlinks are scanned in ascending CS_id order, the inlinks for any given URL B are filled in ascending order. Therefore, the inlinks achieve optimal delta compression, and no sorting is required.

If not all of the inlinks for a partition can fit uncompressed in the available memory, then the indegree histogram is used to divide the partition into disjoint ranges of CS_ids. Each range is processed separately in the manner described above, except that multiple ranges may contribute to the same outstarts and outlinks file. A new pair of files is created only when the compressed offset in inlinks exceeds $2^{32}$, as is the case for outlinks.

In CS1, the preliminary Inlinks Table contains each destination CS_id and destination CS-id pair, and must be sorted by source CS_id. Again, this table does not fit in memory and the algorithm breaks. In CS2, no sorting is required, and multiple passes over the in-memory outstarts and outlinks tables allow the instarts and inlinks tables to be created without any temporary data structures on disk.

III. Operational Features

1.1 URL Compression

CS1 uses only prefix compression of URLs, with a maximum prefix length of 63. In one embodiment, CS2 extends the maximum prefix length to 255, thereby alone increasing compression by about 13%, and adds a second prefix compression. Double compression of URLs yields a smaller compressed size than realizable with a single compression process. In addition, CS2 provides a shorter decompression time. Prefix decompression has been empirically determined to require only about 10 microseconds per chunk of 16 URLs. The more effective methods demonstrated decompression times of 100 microseconds or more per chunk. However, prefix decompression plus decompression by a second method of the much smaller, prefix-compressed chunk, requires only approximately 80 microseconds. The URL data structure is therefore reduced by about 45%.

1.2 Indexes Over the URL Database

In CS1, the CS_ids are stored in the URLs data structure, after each corresponding URL. Therefore, locating the CS_id for a URL requires locating the URL and URL decompression. The ID Index in CS1 locates URLs via a binary search on a set of "special" URLs. Binary searching is more time consuming than the hash table search employed by CS2. In addition, binary searching compares URLs by string comparison, which is more expensive than comparing fingerprints. Since, in one embodiment of CS2, fingerprints are only 64 bits long, they may be compared in one machine instruction. The set of special URLs used in CS1 constitute uncompressed copies of compressed URLs, and take correspondingly more space, approximately 544 bytes each, than do the five bytes per entry to store the fingerprint in CS2. After finding the correct Id Index entry in CS1, an average of 23 URLs must be decompressed until the matching URL is found. The match is similarly performed by string comparisons on each URL. In CS2, the Id Index is separate from the URLs, and locating an ID requires only computing the URL's fingerprint and comparing the fingerprint with (on average, four) other fingerprints.

The Id Index in CS1 does serve to locate URLs. However, this index is not an index from Id to URL, because the Id Index entries in CS1 are not spaced every M URLs (for any value of M, including 1). Consequently, no function of CS_id on the Id Index URLs can locate the URL with CS_id i, and the ID is not stored in the Index. Instead, CS1 overlays a URL index on the Id Index. The URL Index is an array with one entry per CS_id, indexed by CS_id, whose entries point to URL Index entries. The URL Index is thus much larger than in CS2. It is also less efficient in that it involves a second index, a binary search with URL string comparison, and an unbounded number of URL string comparisons after URL decompression. The URL index in the subject invention locates the correct chunk of M URLs in one array lookup. The correct URL can be identified without string comparisons after decompression. The correct URL is the $n^{th}$ URL in the chunk, for a number n between 0 and (M−1). It is computed as (CS_id−Min[CS_id]) mod M.

1.3 URL Fingerprints Stored and Used as Keys

As described herein, one embodiment of CS2 includes fingerprints as a way to identify URLs. This facility is important for outside applications that only reference URL by their much smaller fingerprints. Such applications abound only in existing Web-based search engines.

1.4 Junk URL and Links

A further advantage embodied in the subject invention is that fewer URLs and links are stored for the same data set. All URLs and links that contribute to the construction of the Databases are stored in the data structures. Only URLs that are sources in the input files, are specified in an input list, or otherwise defined as important, because, for example, they have indegree greater than a predetermined value are stored. Furthermore, only links to a stored URL are stored. This optimization greatly reduces the number of URLs and links stored. Approximately 40% as many URLs and about 75% as many links as are stored in CS1, with a corresponding reduction in the RAM required to avoid I/O.

2.0 Host Database

2.1 Host Table Extension for URL Partitioning

The Host Table design in CS1 required augmentation in CS2 in order to accommodate URL partitioning. The Host Table written for CS1 assumes that all URLs on a single host are assigned consecutive CS_ids. URL partitioning in accordance with the subject invention connotes a separate series of consecutive CS_ids in each partition. Therefore, the Host Table includes only the starting CS_id and number of CS_ids columns. The "next" column is not necessary, because all CS_ids on a given host are consecutive in CS1. The Host_id column was not necessary CS1 because it is always the row number of that row, never a different row, as it often is in CS2.

2.2 Host Table Index

A significant improvement of the Host Database is manifested the addition of a Host Index. In CS1, the only way to locate the correct row, and hence Host_id, for a CS_id is to perform a binary search over the Host Table rows. The search requires comparing the given CS_id to the starting CS_id for the row. Binary searching requires an average of $\log_2 N$ comparisons, on a table with millions of rows. Accordingly, a table with a million rows requires 20 comparisons.

In CS2, locating a Host_id requires one lookup in the Host Index, to identify a starting row, and then an examination of consecutive Host Table rows until the correct row is found. Although P is an absolute upper bound on the number of rows that needs to be examined, in practice examination of fewer than three rows sufficient, because P is chosen to be much less than the average number of CS_ids in a series. Also, because four Host Table rows fit in the same hardware cache line on most hardware architectures, accessing consecutive Host Table rows is fast. Note, however, that cache line size may vary among processor architectures and that a processor may have access to with multiple caches.

3.0 Link Database

3.1 Link Array Extension

In CS1, the physical storage of the starts and links arrays is the same as the logical array design described with respect to the subject invention. That is, all link array entries are 32-bit absolute CS_ids, and all starts array entries are 32-bit offsets into the links array. It is noteworthy that the offsets correspond to 32 bit CS_ids in CS1, while each offset correspond to a four bit part of a CS_id in CS2. There is no provision for offsets into a links array with $2^{32}$ or more entries. Stated alternatively, $2^{32}$ is the maximum number of links that can be stored in CS1. The storage requirement for the link database in CS1 is 4*nURLs bytes for the starts arrays, plus 4*nLinks bytes for the links array, for each of the outlinks and inlinks.

3.2 Compression of Link Starts

In the subject invention, the compression of the starts arrays reduces their size to nURLs*((4+2Q)/Q) for the starts entries in Partition 1, and nURLs*((4+Q)/Q) for the starts entries in Partition 2. In one embodiment of the invention, Q=16, and the size of the average starts entry is reduced to 1.5 bytes from 4 bytes.

3.3 Separation of Link Starts

One other optimization of the starts arrays in the subject invention derives from separate storage of the starts arrays. In CS1, the starts arrays for outlinks and inlinks are stored as a single array, where each array entry had two fields: one for outlinks and one for inlinks. Separating the arrays obviates the need to read both starts arrays in order to use only one. For example, the eigenrank process uses only the inlinks starts and links during most of its computation.

3.4 Compression of Links Arrays

The compression of the links arrays in the subject invention reduces their size. In one embodiment, the average outlinks links entry is 2.16 bytes and the average inlinks entry is 1.23 bytes. Four bytes are required in CS1. The inlinks entries compress more than the outlinks entries because they are sorted. As a result, there is no need to use a sign bit, and, more importantly, their delta values are much smaller.

Finally, the URL partitioning by number of outlinks and inlinks signifies that the most frequently referenced CS_ids have numerically low CS_ids, thereby compressing more efficiently.

Accordingly, although an exemplary embodiment of a Connectivity Server and Associated Data Structure for Web Pages has been described in detail herein, those possessed with ordinary skill in the art will readily apprehend various changes and modifications in form and detail to the subject matter so described, to the subject matter so described, without departure from the spirit and scope of the invention. Consequently, the scope of the invention is not properly delimited by the above Description, but is to be established with reference to the appended Claims, and equivalents thereto.

What is claimed is:

1. A connectivity server comprising:
   a URL Database that stores URLs and that associates a fingerprint and a CS_id with each stored URL;
   a Host Database that associates a Host_id with each distinct hostname in the URL database; and
   a Link Database that stores links between a source URL and a destination URL.

2. A connectivity server as defined in claim 1, wherein the URL Database comprises a URL Database Interface for translating between any two of a URL, a fingerprint and a Host_id.

3. A connectivity server as defined in claim 2, wherein in the URL Database Interface is operable to return the minimum CS_id and the maximum CS_id.

4. A connectivity server as defined in claim 3, wherein the CS_ids are consecutive between the minimum CS_id and the maximum CS_id.

5. A connectivity server as defined in claim 1, wherein the URL Database comprises a plurality of partitions and each of the URLs is allocated to one of the partitions in accordance with a predetermined characteristic of the respective URL.

6. A connectivity server as defined in claim 5, wherein each of the URLs is allocated to a partition in accordance with the importance of the URL.

7. A connectivity server as defined in claim 6, wherein the importance of a URL is determined by the indegree and the outdegree of the URL.

8. A connectivity server as defined in claim 7, wherein the URL Database comprises at least three partitions and wherein $Partition_0$ is occupied by URLs with a respective indegree or outdegree greater than or equal to a first number, $Partition_1$ is occupied by URLs with a respective indegree or outdegree greater than or equal to a second number but less than the first number, and $Partition_2$ is occupied by URLs with a respective indegree or outdegree less than the second number.

9. A connectivity server as defined in claim 8, wherein the first number is 255 and the second number is 16.

10. A connectivity server as defined in claim 7, wherein, within each partition, URLs are sorted lexicographically and CS_ids are assigned to URLs sequentially.

11. A connectivity server as defined in claim 1, wherein the URL Database stores URLs in chunks consisting of a predetermined number of URLs.

12. A connectivity server as defined in claim 1, wherein the URL Database stores compressed URLs.

13. A connectivity server as defined in claim 12, wherein URLs are compressed by, for each URL:
   (i) discarding the URL scheme;
   (ii) performing a first prefix compression; and
   (iii) performing a second prefix compression.

14. A connectivity server as defined in claim 13, wherein performing the first prefix compression comprises the steps:
   (ii.a) writing a number followed by a first URL; and
   (ii.b) for each $URL_i$ subsequent to the first URL, writing a one-byte integer followed by a remainder, where the one-byte integer represents the length of a common prefix shared by a $URL_i$ and a $URL_{(i-1)}$ and where the remainder is the portion of $URL_i$ following the common prefix.

15. A connectivity server as defined in claim 14, wherein the second prefix compression is performed in accordance with the ZLIB Compressed Data Format Specification.

16. A connectivity server as defined in claim 1, wherein the URL Database comprises a URL Index Array, wherein each entry in the URL Index Array is a pointer to a compressed chunk of M URLs.

17. A connectivity server as defined in claim 16, wherein the URL Database comprises a plurality of partitions and each of the URLs is allocated to one of the partitions in accordance with a predetermined characteristic of the URL and wherein each of the entries in the URL Index Array is a function of:
   (1) The CS_ids contained in the chunk to which the entry is a pointer;
   (2) M; and
   (3) the Min_CS_id for the partition in which the chunk resides.

18. A connectivity server as defined in claim 17, wherein each entry in the URL Index Array is written separately for each partition.

19. A connectivity server as defined in claim 1, wherein the URL Database comprises an ID Index in the form of a hash table that maps from fingerprints to CS_ids.

20. A connectivity server as defined in claim 19, wherein the ID Index comprises a plurality of buckets and each primary bucket contains a number of entries and a logical pointer to an overflow table.

21. A connectivity server as defined in claim 1, wherein the Host Database comprises a Host Database Interface that accepts a CS_id and returns a corresponding Host_id.

22. A connectivity server as defined in claim 21, wherein the Host Database Interface is operative to accept a Host_id and return a number equal to the number of URLs on the host.

23. A connectivity server as defined in claim 21, wherein the Host Database Interface is operative to accept a Host_id and return the CS_ids of URLs on the host.

24. A connectivity server as defined in claim 1, wherein the Host Database comprises a Host Table, the Host Table in turn comprising a plurality of rows containing information regarding:
  (1) a starting CS_id of a consecutive series of CS_ids on the same host;
  (2) the number of CS_ids in the series;
  (3) the Host_id for the series; and
  (4) the row number of the next highest row containing the same Host_id.

25. A connectivity server as defined in claim 24, wherein the first row ($ROW_0$) is unoccupied.

26. A connectivity server as defined in claim 24, wherein the Host Database comprises a Host Index, where an $i^{th}$ entry in the Host Index contains the largest Host Table row number whose starting CS_id is less than or equal to $i*P$.

27. A connectivity server as defined in claim 1, wherein the Link Database comprises a Link Database Interface operative to retrieve, for a given CS_id, the number of outlinks from the URL corresponding to the CS_id.

28. A connectivity server as defined in claim 27, wherein the Link Database Interface is operative to retrieve, for a given CS_id, the number of inlinks to the URL corresponding to the CS_id.

29. A computer program product for efficiently arranging and storing information regarding the World Wide Web (Web), the computer program product for use in connection with a computer system, the computer system including but not limited to a connectivity server, the computer program product comprising a computer readable storage medium onto which is written information and instructions in the form of a URL Databases that comprises:
  a plurality of URLs;
  a fingerprint associated with each of the URLs; and
  a URL Interface for translating a URL to a fingerprint or to a CS_id, a fingerprint to a URL or to a CS_id, and a CS_id to a URL or to a fingerprint.

30. A computer program product as defined in claim 29, wherein the URL Database comprises at least three partitions and wherein a first partition is occupied by URLs with a respective indegree or outdegree that is greater than a first number, a second partition is occupied by URLs with a respective indegree or outdegree that is greater than or equal to a second number but less than the first number, and a third partition is occupied by URLs with a respective indegree or outdegree that is less than the second number.

31. A computer program product as defined in claim 30, wherein, within each partition, URLs are sorted lexicographically and CS_ids are assigned to URLs sequentially.

32. A computer program product as defined in claim 29, wherein the URL Database stores compressed URLs.

33. A computer program product as defined in claim 32, wherein URLs are compressed by, for each URL:
  (i) discarding the URL scheme;
  (ii) performing a first prefix compression; and
  (iii) performing a second prefix compression.

34. A computer program product as defined in claim 33, wherein the first prefix compression comprises the steps:
  (ii.a) writing a number followed by a first URL; and
  (ii.b) for each $URL_i$ subsequent to the first URL, writing a one-byte integer followed by a remainder, where the one-byte integer represents the length of a common prefix shared by a $URL_i$ and a $URL_{(i-1)}$ and where the remainder is the portion of $URL_i$ following the common prefix.

35. A computer program product as defined in claim 34, wherein the second prefix compression is performed in accordance with the ZLIB Compressed Data Format Specification.

36. A computer program product as defined in claim 29, wherein the URL Database comprises a URL Index Array, wherein each entry in the URL Index Array is a pointer to a compressed chunk of M URLs.

37. A computer program product as defined in claim 36, wherein the URL Database comprises a plurality of partitions and each of the URLs is allocated to one of the partitions in accordance with a predetermined characteristic of the URL and wherein each of the entries in the URL Index Array is a function of:
  (1) The CS_ids contained in the chunk to which the entry is a pointer;
  (2) M; and
  (3) the min_CS_id for the partition in which the chunk resides.

38. A computer program product as defined in claim 37, wherein each entry in the URL Index Array is written separately for each partition.

39. A computer program product as defined in claim 29, wherein the URL Database comprises an ID Index in the form of a hash table that maps from fingerprints to CS_ids.

40. A computer program product as defined in claim 39, wherein the ID Index comprises a plurality of buckets and each primary bucket contains a number of entries and a logical pointer to an overflow table.

41. A processor for storing, arranging and presenting data defining the connectivity of pages on the Web, the processor comprising:
  a URL Database that stores URLs and that associates a fingerprint and a CS_id with, each stored URL, the URL Database comprising:
    a URL Database API and
    a URL Index Array;
  a Host Database that associates a Host_id with each distinct hostname in the URL Database, the host comprising:
    a Host Database API that operates to accept a CS_id and return a corresponding Host_id and to accept a Host_id and return the CS_ids on the corresponding host; and
  a Link Database that stores links between source URLs and destination URLs, the Link Database comprising:
    a Link Database API that operates to retrieve, for a given CS_id, the number of outlinks from the URL corresponding to the CS_id and the number of inlinks to that URL.

42. A processor as defined in claim 41, wherein the URL Database API operates to translate a URL to a fingerprint, a URL to a CS_id, a fingerprint to a URL, a fingerprint to a CS_id, a CS_id to a URL, and a CS_id to a fingerprint.

43. A processor as defined in claim 42, wherein the URL Database comprises a plurality of partitions and each of the URLs is allocated to one of the partitions in accordance with a predetermined characteristic of the respective URL.

44. A processor as defined in claim 43, wherein the URL Database comprises at least three partitions and wherein $Partition_0$ is occupied by URLs with a respective indegree or outdegree greater than or equal to a first number, $Partition_1$ is occupied by URLs with a respective indegree or outdegree greater than or equal to a second number but less than the first number, and Partition$_2$ is occupied by URLs with a respective indegree or outdegree less than the second number.

45. A processor as defined in claim 44, wherein, within each partition, URLs are sorted lexicographically and CS_ids are assigned to URLs sequentially.

46. A processor as defined in claim 45, wherein the URL Database stores compressed URLs.

47. A processor as defined in claim 46, wherein each of the URLs is comprised by:
    (i) discarding the URL scheme;
    (ii) performing a first prefix compression; and
    (iii) performing a second prefix compression.

48. A processor as defined in claim 47, wherein the first prefix compression comprises the steps:
    (ii.a) writing a number followed by a first URL; and
    (ii.b) for each URL$_i$ subsequent to the first URL, writing a one-byte integer followed by a remainder, where the one-byte integer represents the length of a common prefix shared by a URL$_i$ and a URL$_{(i-1)}$ and where the remainder is the portion of URL$_i$ following the common prefix.

49. A processor as defined in claim 48, wherein the URL Database comprises a URL Index Array, wherein each entry in the URL Index Array is a pointer to a compressed chunk of M URLs.

50. A processor as defined in claim 49, wherein the URL Database comprises a plurality of partitions and each of the URLs is allocated to one of the partitions in accordance with a predetermined characteristic of the URL and wherein each of the entries in the URL Index Array is a function of:
    (1) The CS_ids contained in the chunk to which the entry is a pointer;
    (2) M; and
    (3) the Min(CS_id) for the partition in which the chunk resides.

51. A processor as defined in claim 50, wherein the URL Database comprises an ID Index in the form of a hash table that maps from fingerprints to CS_ids.

52. A processor as defined in claim 41, wherein the Host Database comprises a Host Table, the Host Table in turn comprising a plurality of rows containing information regarding:
    (1) a starting CS_id of a consecutive series of CS_ids on the same host;
    (2) the number of CS_ids in the series;
    (3) the Host_id for the series; and
    (4) the row number of the next highest row containing the same Host_id.

53. A processor as defined in claim 52, wherein the Host Database comprises a Host Index, where an $i^{th}$ entry in the Host Index contains the largest Host Table row number whose starting CS_id is less than or equal to i*P.

54. A method of providing data related to the connectivity of pages on the World Wide Web (Web), comprising the steps:
    providing a URL Database that stores URLs and that associates a fingerprint and a CS_id with each stored URL, wherein the URL Database comprises a URL Database API and a URL Index Array;
    providing a Host Database that associates a Host_id with each distinct hostname in the URL Database, wherein the Host Database comprises a Host Database API that operates to accept a CS_id and return a corresponding Host_id and to accept a Host_id and return the CS_ids on the corresponding host; and
    providing a Link Database that stores links between source URLs and destination URLs, wherein the Link Database comprises a Link Database API that operates to retrieve, for a given CS_id, the number of outlinks from the URL corresponding to the CS_id and the number of inlinks to that URL.

55. A method as defined in claim 54, comprising the further step of partitioning the URL Database into at least three partitions, wherein Partition$_0$ is occupied by URLs with a respective indegree or outdegree greater than or equal to a first number, Partition$_1$ is occupied by URLs with a respective indegree or outdegree greater than or equal to a second number but less than the first number, and Partition$_2$ is occupied by URLs with a respective indegree or outdegree less than the second number.

56. A method as defined in claim 55, wherein, within each partition, URLs are sorted lexicographically and CS_ids are assigned to URLs sequentially.

57. A method as defined in claim 54, comprising the step of compressing URLs by:
    (i) discarding the URL scheme;
    (ii) performing a first prefix compression; and
    (iii) performing a second prefix compression.

58. A method as defined in claim 57, wherein the first prefix compression comprises the steps:
    (ii.a) writing a number followed by a first URL; and
    (ii.b) for each URL$_i$ subsequent to the first URL, writing a one-byte integer followed by a remainder, where the one-byte integer represents the length of a common prefix shared by a URL$_i$ and a URL$_{(i-1)}$ and where the remainder is the portion of URL$_i$ following the common prefix.

59. A method as defined in claim 54, comprising the step:
    providing a Host Table for the Host Database, the Host Table comprising a plurality of rows and columns and containing information regarding:
    (1) a starting CS_id of a consecutive series of CS_ids on the same host;
    (2) the number of CS_ids in the series;
    (3) the Host-id for the series; and
    (4) the row number of the next highest row containing the same Host_id.

60. A method of accessing data related to the connectivity of pages on the World Wide Web (Web), comprising the steps:
    accessing a URL Database that stores URLs and that associates a fingerprint and a CS_id with each stored URL, wherein the URL Database comprises a URL Database API and a URL Index Array;
    accessing a Host Database that associates a Host_id with each distinct hostname in the URL Database, wherein the Host Database comprises a Host Database API that operates to accept a CS_id and return a corresponding Host_id and to accept a Host_id and return the CS_ids on the corresponding host; and
    accessing a Link Database that stores links between source URLs and destination URLs, wherein the Link Database comprises a Link Database API that operates to retrieve, for a given CS_id, the number of outlinks from the URL corresponding to the CS_id and the number of inlinks to that URL.

* * * * *